(12) United States Patent
Takahata

(10) Patent No.: US 10,177,348 B2
(45) Date of Patent: Jan. 8, 2019

(54) NONAQUEOUS ELECTROLYTE SECONDARY BATTERY AND PACK BATTERY

(71) Applicant: TOYOTA JIDOSHA KABUSHIKI KAISHA, Toyota-shi, Aichi-ken (JP)

(72) Inventor: Koji Takahata, Nissin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 105 days.

(21) Appl. No.: 14/905,584

(22) PCT Filed: Jul. 2, 2014

(86) PCT No.: PCT/IB2014/001640
§ 371 (c)(1),
(2) Date: Jan. 15, 2016

(87) PCT Pub. No.: WO2015/008142
PCT Pub. Date: Jan. 22, 2015

(65) Prior Publication Data
US 2016/0155995 A1    Jun. 2, 2016

(30) Foreign Application Priority Data
Jul. 17, 2013 (JP) ................................. 2013-148438

(51) Int. Cl.
*H01M 10/04*    (2006.01)
*H01M 10/0525*    (2010.01)
(Continued)

(52) U.S. Cl.
CPC ......... *H01M 2/024* (2013.01); *H01M 2/1077* (2013.01); *H01M 2/348* (2013.01);
(Continued)

(58) Field of Classification Search
None
See application file for complete search history.

(56) References Cited

U.S. PATENT DOCUMENTS

2006/0024578 A1* 2/2006 Lee ........................ H01M 2/18
429/208
2006/0115721 A1* 6/2006 Jeon et al. ........ H01M 10/4207
429/156
(Continued)

FOREIGN PATENT DOCUMENTS

DE    102010043710 A1    5/2012
EP    2 475 023 A1    7/2012
(Continued)

OTHER PUBLICATIONS

Gachot et al., Thermal behaviour of the lithiated-graphite/electrolyte interface through GC/MS analysis, Electrochimica Acta 83, (2012) 402-409, http://dx.doi.org/10.1016/j.electacta.2012.08.016 (Year: 2012).*
(Continued)

Primary Examiner — Ula C Ruddock
Assistant Examiner — Anna Korovina
(74) Attorney, Agent, or Firm — Sughrue Mion, PLLC

(57) ABSTRACT

A nonaqueous electrolyte secondary battery includes a wound electrode body housed in a battery case. The wound electrode body is positioned to the battery case with a positioning member. Among a spatial volume excluding the wound electrode body in the battery case, in a direction of a winding axis of the wound electrode body, a spatial volume X on a negative electrode side of the battery case is larger than a spatial volume Y on a positive electrode side of the battery case. Here, the spatial volume X and the spatial volume Y satisfy $2.1 \leq (X/Y) \leq 5.7$.

6 Claims, 9 Drawing Sheets

(51) Int. Cl.
  *H01M 10/0587* (2010.01)
  *H01M 4/13* (2010.01)
  *H01M 2/34* (2006.01)
  *H01M 2/02* (2006.01)
  *H01M 2/10* (2006.01)

(52) U.S. Cl.
  CPC ......... *H01M 4/13* (2013.01); *H01M 10/0431* (2013.01); *H01M 10/0525* (2013.01); *H01M 10/0587* (2013.01); *H01M 2220/20* (2013.01); *Y02E 60/122* (2013.01); *Y02T 10/7011* (2013.01)

(56) References Cited

U.S. PATENT DOCUMENTS

| | | | | |
|---|---|---|---|---|
| 2007/0048613 | A1* | 3/2007 | Yanagida | H01M 4/66 429/245 |
| 2008/0078815 | A1* | 4/2008 | Taniguchi | B23K 20/10 228/110.1 |
| 2009/0098446 | A1* | 4/2009 | Fujita et al. | H01M 2/1673 429/94 |
| 2010/0209749 | A1* | 8/2010 | Okada | H01M 2/0242 429/94 |
| 2012/0189902 | A1* | 7/2012 | Kim | H01M 2/1022 429/159 |
| 2012/0308869 | A1 | 12/2012 | Obasih et al. | |
| 2013/0071710 | A1* | 3/2013 | Saito | H01M 10/0431 429/94 |
| 2014/0193682 | A1* | 7/2014 | Suzuki | H01M 10/052 429/94 |

FOREIGN PATENT DOCUMENTS

| | | |
|---|---|---|
| JP | 2011-243527 A | 12/2011 |
| JP | 2014-154291 A | 8/2014 |
| KR | 10-2012-0086656 A | 8/2012 |
| WO | WO-2013030879 A1 * | 3/2013 ......... H01M 10/052 |

OTHER PUBLICATIONS

Chen et al., Thermal Analysis of Lithium-Ion Batteries, J. Electrochem. Soc. 1996, vol. 143, issue 9, 2708-2712, doi: 10.1149/1.1837095 (Year: 1996).*

* cited by examiner

NONAQUEOUS ELECTROLYTE SECONDARY BATTERY AND PACK BATTERY

BACKGROUND OF THE INVENTION

1. Field of the Invention

The present invention relates to a nonaqueous electrolyte secondary battery and a pack battery. In the present specification, the "secondary battery" generally means a battery that can be repeatedly used. The "nonaqueous electrolyte secondary battery" means a secondary battery that uses a nonaqueous electrolyte made of a nonaqueous solvent in which an electrolyte salt is dissolved. Further, a "lithium ion secondary battery" that is one kind of the "nonaqueous electrolyte secondary battery" means a secondary battery that makes use of a lithium ion as an electrolyte ion and realizes charging and discharging by a movement of electric charges accompanying lithium ions between a positive electrode and a negative electrode. In general, a battery called such as a "lithium secondary battery" can be contained in the lithium ion secondary battery in the present specification.

2. Description of Related Art

Japanese Patent Application Publication No. 2011-243527 (JP 2011-243527 A), for example, discloses a secondary battery in which a wounded electrode body is housed in a battery case. JP 2011-243527 A proposes such that, in a width direction of a positive electrode sheet, a positive electrode current collector has a distance A from an edge of a positive electrode active material layer on an uncoated side to an inner wall of the battery case longer than a distance B from an edge of the positive electrode active material layer on a side opposite to the uncoated side to an inner wall of the battery case (A>B). Specifically, JP 2011-243527 A discloses a lithium ion secondary battery in which the wound electrode body is slightly displaced toward the negative electrode side with respect to the battery case and fixed. Thus, the distance A described above can be secured longer. Further, on the positive electrode side of the battery case and the wound electrode body of the lithium ion secondary battery proposed in JP 2011-243527 A, a degassing path is expanded and a gas discharged in gaps on the positive electrode side can smoothly be discharged. From what was described above, it is said that, at the end of overcharging, safeness when short-circuiting occurred can be improved.

SUMMARY OF THE INVENTION

The secondary battery disclosed in JP 2011-243527 A proposes a mode by which the safeness particularly to the short-circuiting at the end of the overcharging can be improved. By contrast, the present invention provides a nonaqueous electrolyte secondary battery and a pack battery that are suitable in a viewpoint that local heat generation of the battery during overcharging can be suppressed to a small level and the battery performance in applications where charging and discharging are repeated at a high rate can be maintained at a high level.

A nonaqueous electrolyte secondary battery according to a first aspect of the present invention includes: a wound electrode body wound along one plane including a winding axis; a battery case housing the wound electrode body such that the winding axis and a sidewall of the battery case intersect, a spatial volume excluding the wound electrode body in the battery case including a first spatial volume on a negative electrode side of the battery case and a second spatial volume on a positive electrode side of the battery case, the first spatial volume being larger than the second spatial volume in a direction of the winding axis of the wound electrode body, a first value being obtained by dividing the first spatial volume by the second spatial volume, and the first value being equal to or larger than 2.1 and equal to or smaller than 5.7; and a positioning member positioned the wound electrode body to the battery case. According to such a nonaqueous electrolyte secondary battery, in particular, the local heat generation during overcharging can be suppressed to a small level. Further, in applications where charging and discharging are repeated at a high rate, an increase in a resistance of the nonaqueous electrolyte secondary battery can be suppressed to a low level.

In the above aspect, the first spatial volume may be a spatial volume between an end on an uncoated section side of a negative electrode sheet and a sidewall of the battery case, and the second spatial volume may be a spatial volume between an end on an uncoated section side of a positive electrode sheet and the sidewall of the battery case. In the above aspect, the battery case may be a rectangular parallelepiped, the wound electrode body may include a belt positive electrode sheet and a belt negative electrode sheet, the belt positive electrode sheet and the belt negative electrode sheet are superposed with a belt separator interposed between the belt positive electrode sheet and the belt negative electrode sheet, and the wound electrode body being wound, the positive electrode sheet may include a belt positive electrode current collector, a first uncoated section disposed on the positive electrode current collector along an edge in a direction of a winding axis of the positive electrode current collector, and a positive electrode active material layer containing a positive electrode active material and held on both sides of the positive electrode current collector excluding the first uncoated section, the negative electrode sheet may include a belt negative electrode current collector having thermal conductivity higher than that of the positive electrode current collector, a second uncoated section disposed on the negative electrode current collector along an edge in a direction of a winding axis of the negative electrode current collector, and a negative electrode active material layer containing a negative electrode active material and held on both sides of the negative electrode current collector excluding the second uncoated section, a length of the negative electrode active material layer may be longer than a length of the positive electrode active material layer in a direction of the winding axis, and the positive electrode sheet and the negative electrode sheet may be superposed such that the positive electrode active material layer is covered with the negative electrode active material layer and the first uncoated section and the second uncoated section are positioned on opposite sides each other in a width direction of the winding axis. Here, for example, the positive electrode current collector may be aluminum, and the negative electrode current collector may be copper.

In the aspect described above, a pack battery includes a plurality of the nonaqueous electrolyte secondary batteries described above are assembled. Here, the nonaqueous electrolyte secondary batteries are faced with surfaces having a larger width of the battery case and superposed the surfaces. The adjacent wound electrode bodies may be offset each other in the direction of the winding axis. In this case, the nonaqueous electrolyte secondary batteries may be adjacently assembled, the nonaqueous electrolyte secondary batteries may have an offset rate equal to or larger than 1.3 and equal to or smaller than 6.0, the offset rate is defined with a width in the direction of the winding axis of the wound electrode body and an amount of offset in the direction of the winding axis of the adjacent wound electrode bodies, and the offset rate being obtained by multiplying a second value, which is obtained by dividing the amount of offset by the width, by 100.

A second aspect of the present invention includes a pack battery. The pack battery includes a plurality of nonaqueous electrolyte secondary batteries superposed and assembled, the nonaqueous electrolyte secondary batteries including a rectangular parallelepiped battery case and a wound electrode body including a belt positive electrode sheet and a belt negative electrode sheet superposed with a belt separator interposed between the belt positive electrode sheet and the belt negative electrode sheet, the wound electrode body being wound along one plane surface including a winding axis, the wound electrode body being housed in the battery case such that the winding axis and a sidewall of the battery case intersect, the nonaqueous electrolyte secondary batteries being faced surfaces having a larger width of the battery case and being superposed, the nonaqueous electrolyte secondary batteries being offset each other in a direction of the winding axis. The wound electrode body may be located at a nearly center of the battery case.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a nonaqueous electrolyte secondary battery according to one embodiment of the present invention will be described. The embodiment described herein is not naturally intended to particularly limit the present invention. Further, the respective drawings are schematically depicted, and dimensional relationship (length, width, thickness and so on) in the respective drawings does not reflect actual dimensional relationship. Further, like numerals denote like members and sites and duplicated description thereof will be omitted or simplified.

Herein, as an example of a structure of a nonaqueous electrolyte secondary battery that can be applied, a lithium ion secondary battery 10 is first described, and, after that, based thereon, a nonaqueous electrolyte secondary battery proposed here will be described.

Figure 1:
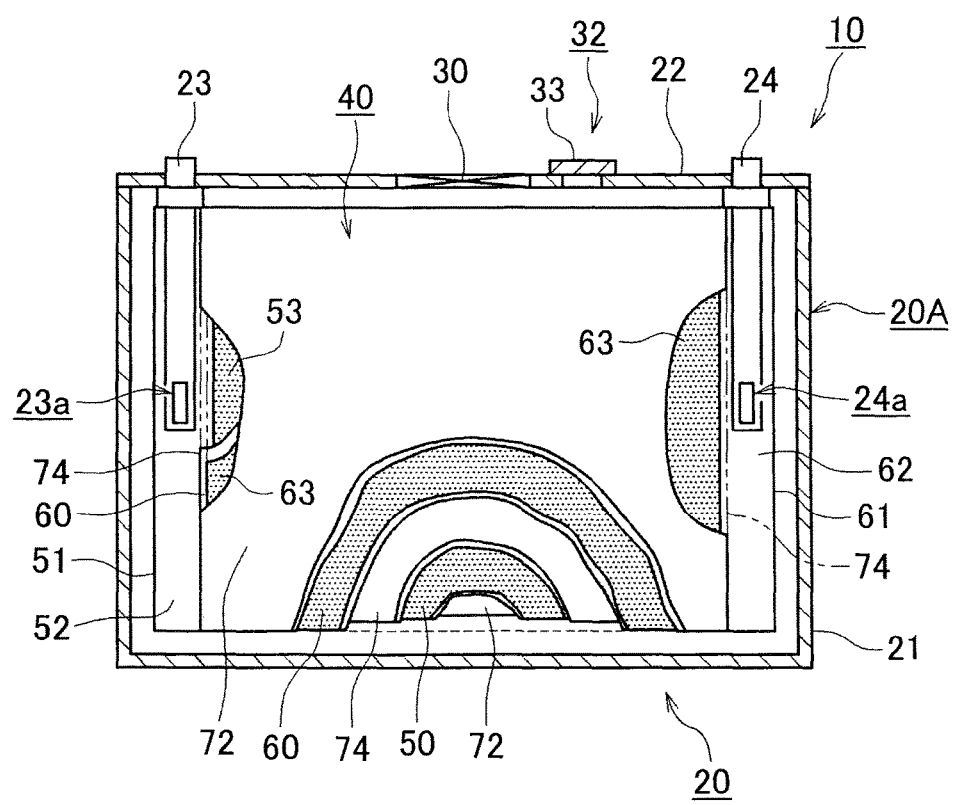
FIG. 1 is a partial cross-sectional view that shows a lithium ion secondary battery.
Figure 2:
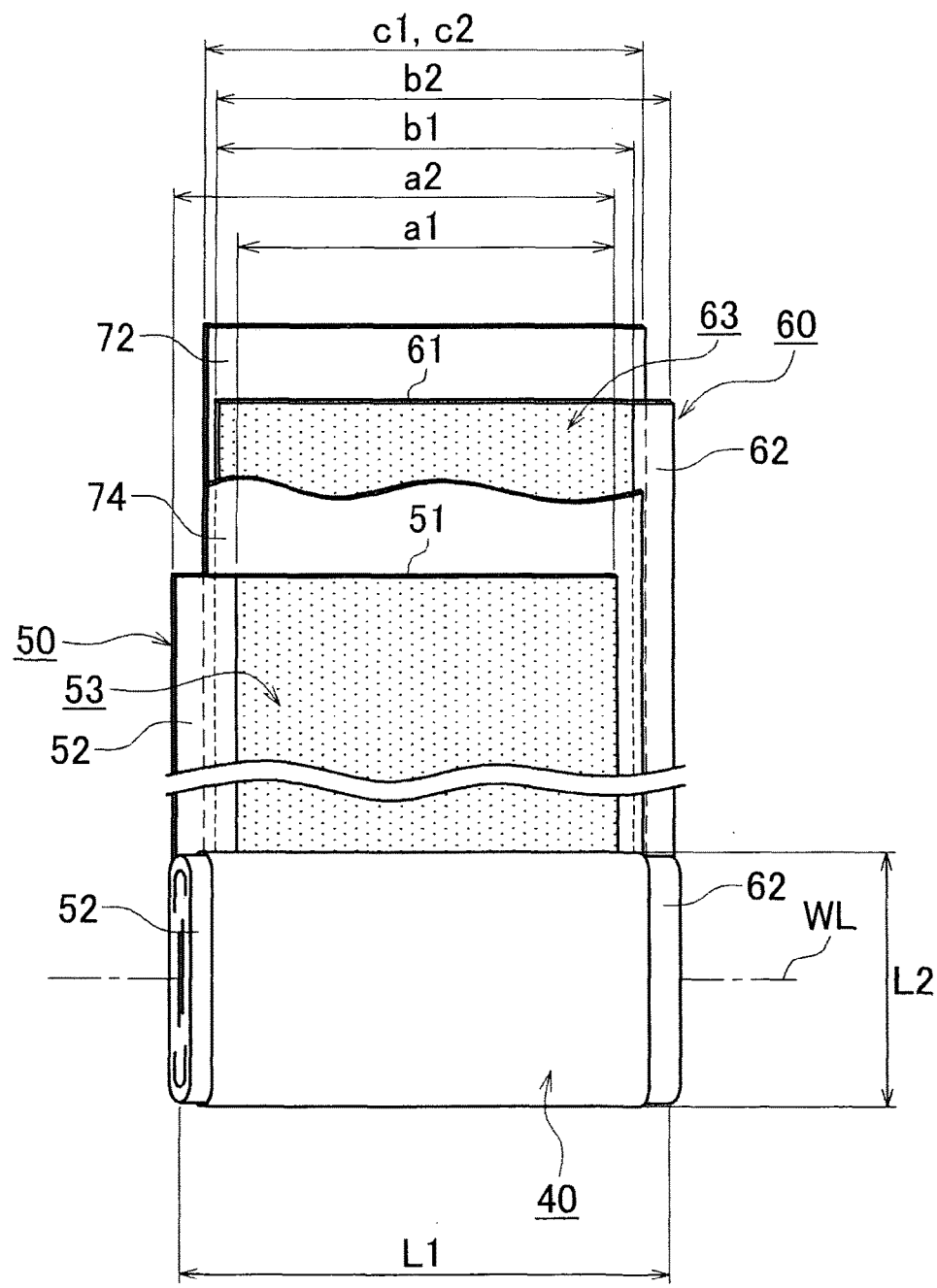
FIG. 2 is a diagram that shows an electrode body incorporated in the lithium ion secondary battery.

FIG. 1 is a cross-sectional view that shows the lithium ion secondary battery 10. FIG. 2 is a diagram that shows an electrode body 40 incorporated in the lithium ion secondary battery 10. The lithium ion secondary battery 10 shown in FIG. 1 and FIG. 2 is only one example of lithium ion secondary batteries to which the present invention can be applied and does not particularly limit the lithium ion secondary battery to which the present invention can be applied.

The lithium ion secondary battery 10 includes, as shown in FIG. 1, a battery case 20 and an electrode body 40 (a wound electrode body in FIG. 1).

The battery case 20 includes a case body 21 and a sealing plate 22. The case body 21 has a box shape that has an opening section at one end. Herein, the case body 21 has a bottomed rectangular parallelepiped shape in which one surface corresponding to an upper surface in a usual use state of the lithium ion secondary battery 10 is opened. In the present embodiment, the case body 21 is provided with a rectangular opening. The sealing plate 22 is a member that seals the opening of the case body 21. The sealing plate 22 is formed in a roughly rectangular plate. By welding such sealing plate 22 to a periphery of the opening of the case body 21, a nearly hexahedron shaped battery case 20 is formed.

As a material of the battery case 20, for example, a material that is mainly formed with a metal material that is light and excellent in the thermal conductivity can preferably be used. As such metal materials, for example, aluminum, stainless steel, nickel-plated steel and the like can be illustrated. The battery case 20 (case body 21 and sealing plate 22) according to the present embodiment is formed with aluminum or an alloy mainly made of aluminum.

In an example shown in FIG. 1, a positive electrode terminal 23 (external terminal) and a negative electrode terminal 24 (external terminal), which are used for use in external connection are attached to the sealing plate 22. A safety valve 30 and a liquid injection port 32 are formed in the sealing plate 22. The safety valve 30 is formed such that when an internal pressure of the battery case 20 rises to a level equal to or more than a predetermined level, the internal pressure is released. The predetermined level is a set valve opening pressure of about 0.3 MPa to 1.0 MPa, for example. Further, in FIG. 1, a state in which after an electrolytic solution is injected in the battery case 20, the liquid injection port 32 is sealed with a sealing member 33 is illustrated. In such battery case 20, the electrode body 40 is housed.

The electrode body 40 includes, as shown in FIG. 2, a belt positive electrode (positive electrode sheet 50), a belt negative electrode (negative electrode sheet 60), and belt separators (separators 72 and 74).

The positive electrode sheet 50 includes a belt positive electrode current collector foil 51 and a positive electrode active material layer 53. A metal foil suitable for a positive electrode can preferably be used as the positive electrode current collector foil 51. For example, a belt aluminum foil having a predetermined width and a thickness of about 15 μm can be used in the positive electrode current collector foil 51. An uncoated section 52 is disposed along an edge on one side in a width direction of the positive electrode current collector foil 51. In an illustrated example, the positive electrode active material layer 53 is formed on both sides of the positive electrode current collector foil 51 excluding the uncoated section 52 disposed on the positive electrode current collector foil 51. Here, the positive electrode active material layer 53 is held by the positive electrode current collector foil 51 and contains at least a positive electrode active material. In the present embodiment, the positive electrode active material layer 53 is formed by coating a positive electrode mixture containing a positive electrode active material on the positive electrode current collector foil 51. Further, the "uncoated section 52" means a site in which the positive electrode active material layer 53 is not held (coated, formed) on the positive electrode current collector foil 51.

As the positive electrode active material, one or two or more kinds of substances that have been used in the lithium ion batteries can be used without particular restriction. As preferable examples, oxides that contain lithium and a transition metal element as constituent metal elements (lithium transition metal oxides) such as lithium nickel oxide ($LiNiO_2$, for example), lithium cobalt oxide ($LiCoO_2$, for example), and lithium manganese oxide ($LiMn_2O_4$, for example) can be used. Further, phosphates that contain lithium and a transition metal element as constituent metal elements such as lithium manganese phosphate ($LiMnPO_4$) and lithium iron phosphate ($LiFePO_4$) can be used.

As a conductive material, for example, carbon materials such as carbon powder and carbon fiber can be used. One kind selected from such conductive materials may be used alone or two or more kinds thereof may be used together. As the carbon powder, carbon powders such as various carbon blacks (for example, acetylene black, oil furnace black, graphitized carbon black, carbon black, graphite, and Ketjen Black) and graphite powder can be used.

A binder binds the respective particles of the positive electrode active material and the conductive material that are contained in the positive electrode active material layer 53, and binds these particles with the positive electrode current collector foil 51. As such a binder, a polymer that can be dissolved or dispersed in a solvent to be used can be used. For example, in a positive electrode mixture composition that uses an aqueous solvent, aqueous or water dispersible polymers such as cellulose-based polymers (for example, carboxymethyl cellulose (CMC), hydroxypropyl methylcellulose (HPMC)), fluororesins (for example, polyvinyl alcohol (PVA), polytetrafluoroethylene (PTFE), and tetrafluoroethylene-hexafluoropropylene copolymer (FEP)), and rubbers (vinyl acetate copolymer, styrene-butadiene copolymer (SBR), and acrylic acid-modified SBR resin (SBR-based latex)) can preferably be used. In the positive electrode mixture composition that uses a nonaqueous solvent, a polymer (polyvinylidene fluoride (PVDF), polyvinylidene chloride (PVDC), and polyacrylonitrile (PAN)) can preferably be used.

The negative electrode sheet 60 includes, as shown in FIG. 2, a belt negative electrode current collector foil 61 and a negative electrode active material layer 63. A metal foil suitable for the negative electrode can preferably be used in the negative electrode current collector foil 61. A belt copper foil having a predetermined width and a thickness of about 10 μm is used in the negative electrode current collector foil 61. An uncoated section 62 is disposed along an edge on one side in a width direction of the negative electrode current collector foil 61. The negative electrode active material layer 63 is formed on both sides of the negative electrode current collector foil 61 excluding the uncoated section 62 disposed on the negative electrode current collector foil 61. The negative electrode active material layer 63 is held by the negative electrode current collector foil 61 and contains at least a negative electrode active material. In the present embodiment, the negative electrode active material layer 63 is formed by coating a negative electrode mixture containing a negative electrode active material on the negative electrode current collector foil 61. Further, the "uncoated section 62" means a site in which the negative electrode active material layer 63 is not held (coated, formed) on the negative electrode current collector foil 61.

As the negative electrode active material, one or two or more kinds of substances that have been used in the lithium ion batteries can be used without particular restriction. Preferable examples include carbonaceous materials such as graphite carbon and amorphous carbon, lithium transition metal oxides, and lithium transition metal nitrides.

The separators 72 and 74 are, as shown in FIG. 2, a member that separates the positive electrode sheet 50 and the negative electrode sheet 60. In the embodiment, the separators 72 and 74 are formed of a belt sheet material that has a plurality of fine pores and a predetermined width. As the separators 72 and 74, a separator of a single layer structure or a separator of a laminate structure formed of a resinous porous film, for example, a porous polyolefin-based resin can be used. In the embodiment, as shown in FIG. 2, a width (a length of the negative electrode active material layer in the direction of the winding axis) b1 of the negative electrode active material layer 63 is slightly larger (longer) than a width (a length of the positive electrode active material layer in the direction of the winding axis) a1 of the positive electrode active material layer 53. Further, widths of the separators 72 and 74 (lengths of the separators 72 and 74 in the direction of the winding axis) c1 and c2 are slightly larger (longer) than the width (length of the negative electrode active material layer in the direction of the winding axis) b1 of the negative electrode active material layer 63 (c1, c2>b1>a1).

Further, the separators 72 and 74 insulate between the positive electrode active material layer 53 and the negative electrode active material layer 63 and allow the electrolyte to migrate. The separators 72 and 74 may have a heat-resistant layer formed on a surface of a base material made of a plastic porous film. The heat-resistant layer includes a filler and a binder. The heat-resistant layer is also called as a heat resistance layer (HRL).

In the present embodiment, the electrode body 40 is, as shown in. FIG. 2, pushed and bent flatly along one plane containing the winding axis WL. The electrode body 40 is wound along one plane containing the winding axis WL. In an embodiment shown in FIG. 2, the uncoated section 52 of the positive electrode current collector foil 51 and the uncoated section 62 of the negative electrode current collector foil 61 respectively are spirally exposed on both sides of the separators 72 and 74. The uncoated section 52 and the uncoated section 62 are superposed so, as to locate on opposite sides from each other in a width direction of the winding axis. In the embodiment, as shown in FIG. 1, in the electrode body 40, intermediate sections of the positive uncoated section 52 and negative uncoated sections 62 exposed from the separators 72 and 74 respectively are welded to tip ends 23a and 24a of positive and negative internal terminals 23 and 24 disposed in the inside of the battery case 20.

The electrode body 40 is, as shown in FIG. 1, housed in the battery case 20. In the battery case 20, an electrolytic solution is further injected. The electrolytic solution infiltrates into the inside of the electrode body 40 from both sides of an axial direction of the winding axis WL (see FIG. 2).

As the electrolytic solution, the electrolytic solutions the same as the nonaqueous electrolytic solutions that have been conventionally used in the lithium ion batteries can be used without particular restriction. Such nonaqueous electrolytic solution typically has a composition in which a supporting salt (supporting electrolyte) is contained in a proper nonaqueous solvent. As the nonaqueous solvent, one or two or more kinds selected from the group consisting of, for example, ethylene carbonate, propylene carbonate, dimethyl carbonate, diethyl carbonate, ethylmethyl carbonate, 1,2-dimethoxyethane, 1,2-diethoxyethane, tetrahydrofuran, and 1,3-dioxolan can be used. Further, as the supporting salts described above, for example, lithium salts such as $LiPF_6$, $LiBF_4$, $LiAsF_6$, $LiCF_3SO_3$, $LiC_4F_9SO_3$, $LiN(CF_3SO_2)_2$, and $LiC(CF_3SO_2)_3$ can be used. As an example, a nonaqueous electrolytic solution in which in a mixed solvent of ethylene carbonate and diethyl carbonate (mass ratio: 1:1, for example), $LiPF_6$ is contained at a concentration of about 1 mol/L can be used.

The positive electrode current collector foil 51 and negative electrode current collector foil 61 of such lithium ion secondary battery 10 are electrically connected via electrode terminals 23 and 24 penetrated through the battery case 20 to an external device. Hereinafter, operations of the lithium ion secondary battery 10 during charging and during discharging will be described.

Figure 3:
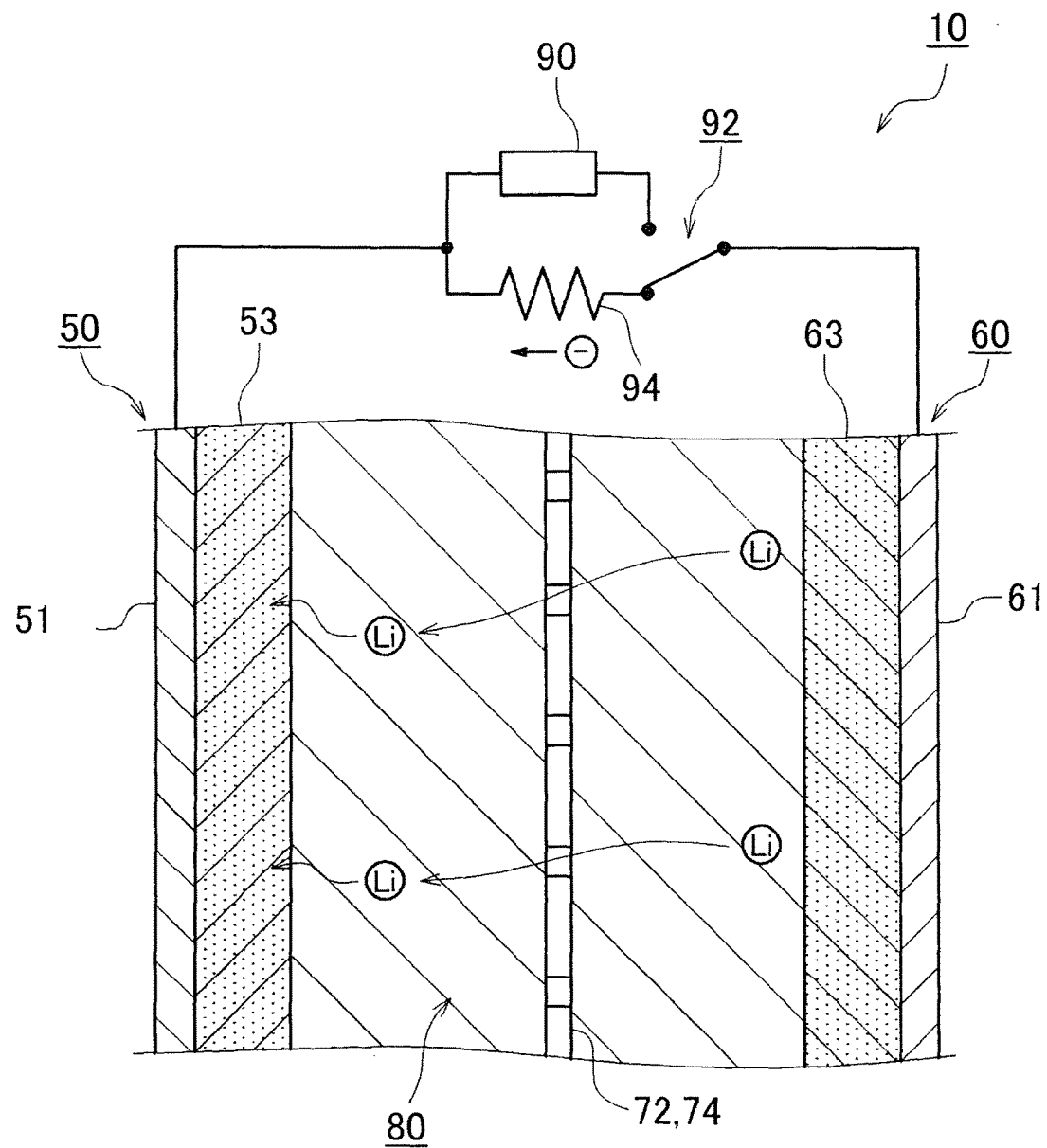
FIG. 3 is a schematic view that shows a state of the lithium ion secondary battery during discharging.

FIG. 3 schematically shows a state during discharging of such lithium ion secondary battery 10. During discharging, electrode terminals 23 and 24 (see FIG. 1) of the lithium ion secondary battery 10 become, as shown in FIG. 3, a state connected to a resistance 94 by a switch 92. In this case, due to a potential difference of the negative electrode sheet 60 and the positive electrode sheet 50, electric charges are delivered from the negative electrode sheet 60 to the positive electrode sheet 50 via the resistance 94 and lithium ions stored in the negative electrode active material layer 63 are emitted into an electrolytic solution 80. Further, in the positive electrode, lithium ions in the electrolytic solution 80 are incorporated in the positive electrode active material in the positive electrode active material layer 53.

Figure 4:
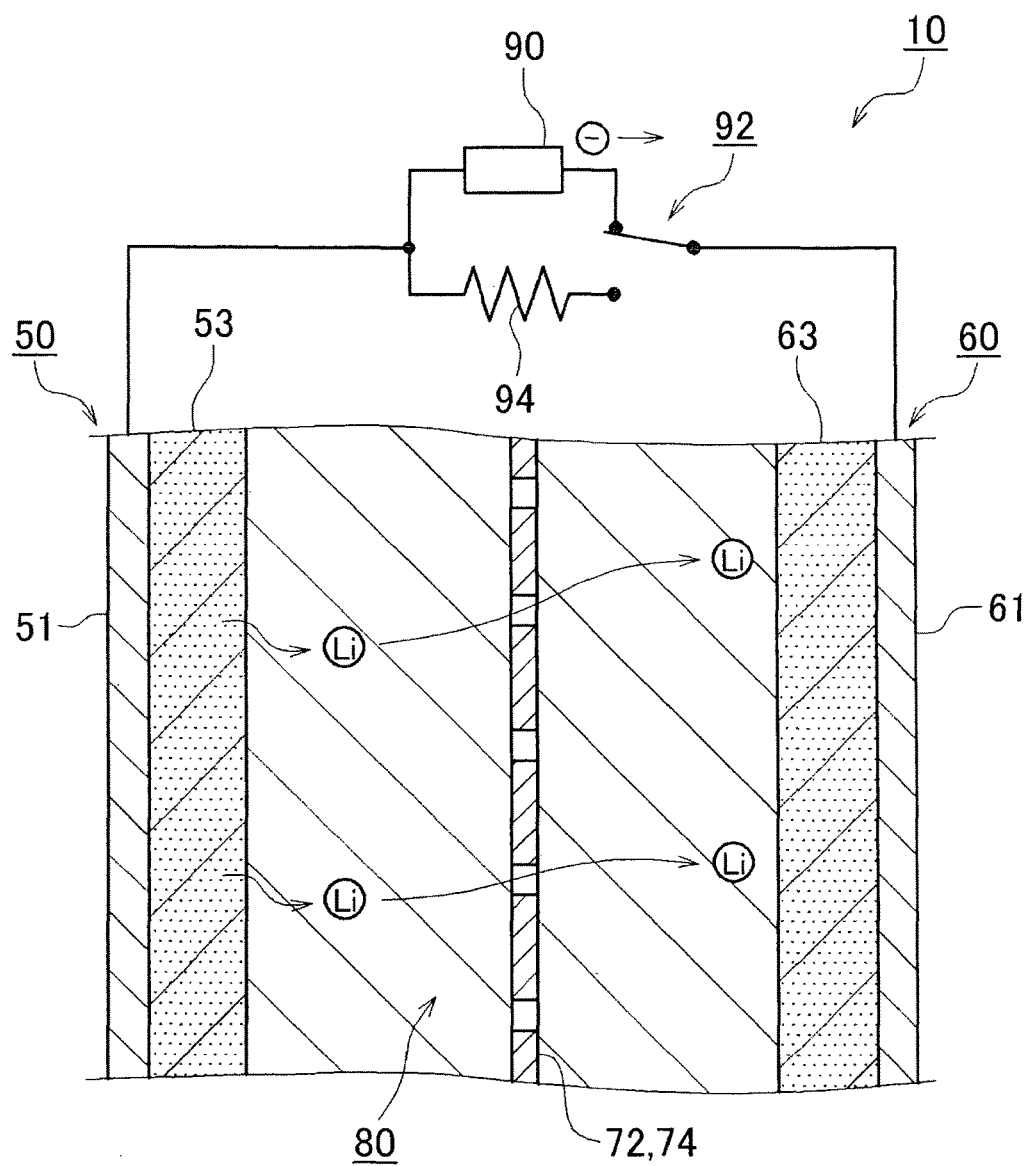
FIG. 4 is a schematic view that shows a state of the lithium ion secondary battery during charging.

FIG. 4 schematically shows a state of such lithium ion secondary battery 10 during charging. During charging, electrode terminals 23 and 24 of the lithium ion secondary battery 10 (see FIG. 1) become, as shown in FIG. 4, a state that is connected to a battery charger 90 by the switch 92. In this case, due to an action of the battery charger 90, a voltage is applied between the positive electrode sheet 50 and the negative electrode sheet 60, lithium ions (Li) are emitted from the positive electrode active material in the positive electrode active material layer 53 into the electrolytic solution 80, and electric charges are emitted from the positive electrode active material layer 53. The emitted electric charges are transported to the positive electrode current collector foil 51 and transported to the negative electrode sheet 60 via the battery charger 90. Further, in the negative electrode sheet 60, the electric charges are stored, and the lithium ions (Li) in the electrolytic solution 80 are absorbed by the negative electrode active material in the negative electrode active material layer 63 and stored therein. Thus, a potential difference is generated between the negative electrode sheet 60 and the positive electrode sheet 50.

Thus, in the charging and discharging of the lithium ion secondary battery 10, the lithium ions are stored in or emitted from the positive electrode active material in the positive electrode active material layer 53 and the negative electrode active material in the negative electrode active material layer 63. Thus, via the electrolytic solution 80, the lithium ions are interchanged between the positive electrode active material layer 53 and the negative electrode active material layer 63.

Now, the lithium ion secondary battery 10 like this can realize such a high output that exceeds 4 V, for example. Therefore, it can preferably be used as a driving power source of an electric vehicle and a hybrid vehicle, in which a high output is required, in particular during a start and an acceleration. Further, the lithium ion secondary battery 10 is high in a charging efficiency and can be applied also to rapid charging. For example, the lithium ion secondary battery 10 can be applied also to an energy-regenerating system that regenerates a kinetic energy as an electric energy during a deceleration (during braking) of a vehicle and charges. Further, in use for vehicle, in particular, when driving in town, acceleration and deceleration are repeated. Accompanying this, when the lithium ion secondary battery 10 is used as a driving power source in an electric vehicle or a hybrid vehicle, high-output discharging and rapid charging are repeated. Further, it is desirable that even when a system trouble occurred in an electric vehicle or a hybrid vehicle, and the lithium ion secondary battery 10 is put into an overcharged state, necessary safeness is secured.

According to the knowledge of the present inventors, when the lithium ion secondary battery 10 such as described above is charged up to a high-potential of, for example, about 4.8 V, the electrolytic solution is gradually decomposed due to the high-potential and a temperature increases due to heat of decomposition thereof. At this time, in particular, a temperature of a side surface 20A on the negative electrode side of the battery case 20 tends to rise locally. Regarding a tendency for a temperature of the side surface 20A on the negative electrode side of the battery case 20 to rise locally, the present inventors infer as shown below. That is, the lithium ion secondary battery, when charged up to a high-potential of, for example, about 4.8 V, becomes a so-called overcharged state and generates heat. At this time, in particular, on the negative electrode side, the electrolytic solution tends to be decomposed and the temperature tends to rise. In the proximity where a path for releasing the heat is blocked, a temperature increase is inferred to be larger than other than the proximity thereof.

A copper foil that is used in the negative electrode current collector foil 61 that is a base material of the negative electrode has thermal conductivity larger than that of an aluminum foil used in the positive electrode current collector foil 51 that is a base material of the positive electrode. The heat in the wound electrode body 40 is transmitted through the negative electrode current collector foil 61 to the negative electrode terminal 24. In particular, when charged to a high-potential of about 4.8 V, in the wound electrode body 40, many lithium ions are contained in the negative electrode active material in the negative electrode active material layer 63. Therefore, the electrolytic solution tends to be decomposed in the negative electrode active material layer 63 and in the neighborhood thereof. The heat generated accompanying the decomposition of the electrolytic solution in the negative electrode active material layer 63 and in the neighborhood thereof tends to be transmitted much to the negative electrode terminal 24 via the negative electrode current collector foil 61. These are assumed to be associated with the tendency that the negative electrode side is likely to be a high temperature. For example, the heat generated on the negative electrode side can externally be emitted via the negative electrode terminal. At this time, in the uncoated section 62 of the negative electrode sheet 60 and the proximity site of the negative electrode terminal 24, a temperature of the battery case 20 becomes locally higher. The present inventors consider, based on the knowledge like this, that it is desirable to suppress the local temperature increase to a low level in the overcharging state in the lithium ion secondary battery 10 used in a driving power source of an electric vehicle or a hybrid vehicle.

Further, according to the knowledge of the present inventors, after a high-rate cycle test where high-output discharging and a rapid charging are repeated, a resistance of the lithium ion secondary battery 10 tends to increase. Such resistance increase in the lithium ion secondary battery 10 can cause a decrease in output or charging efficiency of the lithium ion secondary battery 10. The present inventors consider that it is desirable to suppress a degree of an increase in the resistance of the lithium ion secondary battery 10 after the high-rate cycle test to a low level in the lithium ion secondary battery 10 used as a driving power source of an electric vehicle or a hybrid vehicle.

Further, when the high-output discharging and the rapid charging are repeated, the lithium ions vigorously move in the lithium ion secondary battery 10. In this case, a part of the lithium ions precipitates in some cases on a surface of the negative electrode as metallic lithium. A part of the lithium ions precipitated on the surface of the negative electrode can be lithium ions again and contribute to a battery reaction. However, the metallic lithium precipitated on the surface of the negative electrode, in some cases, remains in a state precipitated as the metallic lithium and does not contribute to the battery reaction. When an amount of precipitates of the metallic lithium that does not contribute to the battery reaction increases on the negative electrode surface of the lithium ion secondary battery 10, there is a tendency that a capacity of the lithium ion secondary battery 10 decreases or the resistance of the lithium ion secondary battery 10 increases.

The present inventors propose, in a viewpoint like this, a novel structure of the lithium ion secondary battery 10 and the pack battery.

Figure 5:
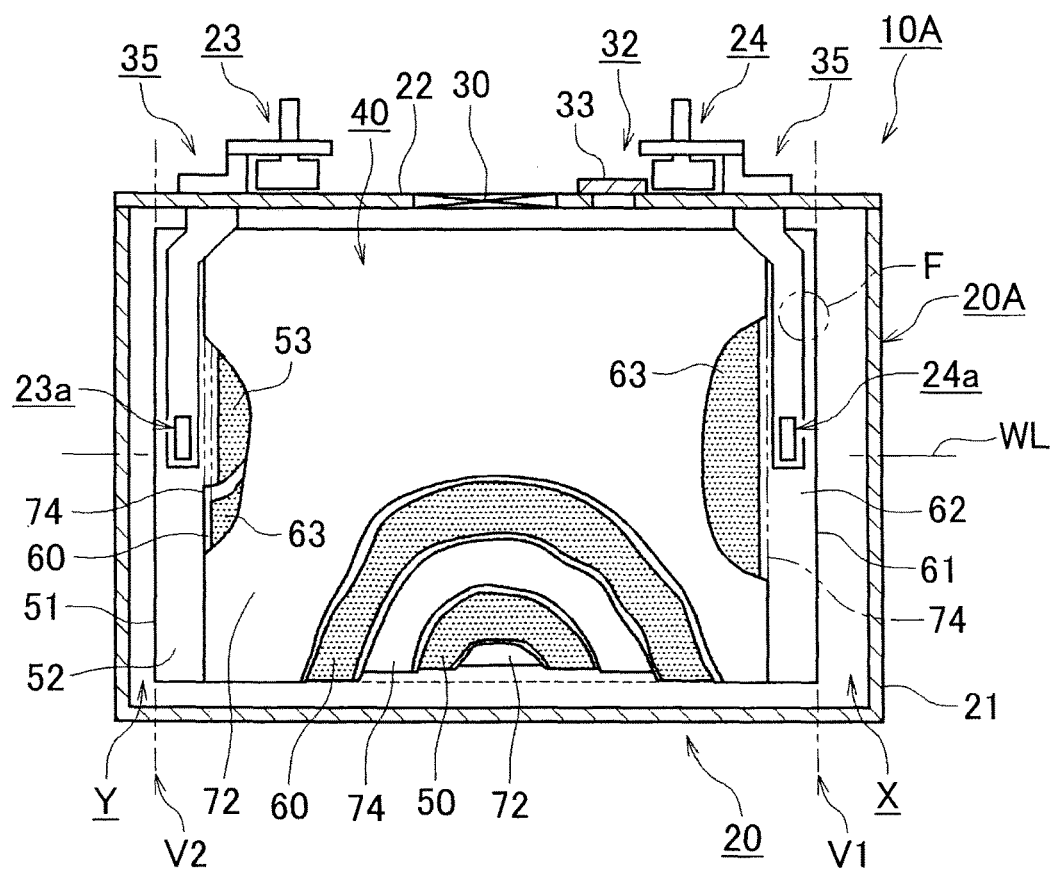
FIG. 5 is a partial cross-sectional view that shows a lithium ion secondary battery proposed herein.

FIG. 5 is a partial cross-sectional view that shows a lithium ion secondary battery 10A that is proposed here. Specifically, the lithium ion secondary battery 10A that is proposed here includes, as shown in FIG. 5, the wound electrode body 40, the battery case 20, and a positioning member 35.

The wound electrode body 40 shown in FIG. 5 has a structure similar to that of the wound electrode body 40 of the lithium ion secondary battery 10 in FIG. 1 described above, and duplicated descriptions thereof are omitted. Here, in the wound electrode body 40, the belt positive electrode sheet 50 and the belt negative electrode sheet 60 are superposed with the belt separators 72 and 74 interposed therebetween and wound. Here, in the present embodiment, an aluminum foil is used as the positive electrode current collector foil 51. Further, a copper foil is used as the negative electrode current collector foil 61. In the battery case 20, the wound electrode body 40 is disposed by displacing toward a side where the uncoated section 52 of the positive electrode sheet 50 is disposed.

Thus, among a spatial volume excluding the wound electrode body 40 in the battery case 20, a spatial volume X on the negative electrode side of the battery case in the direction of the winding axis WL of the wound electrode body 40 is set larger than a spatial volume Y on the positive electrode side of the battery case. Here, the "spatial volume X on the negative electrode side" is a spatial volume on a side where the uncoated section 62 of the negative electrode sheet 60 of the wound electrode body 40 is disposed in the direction of the winding axis WL of the wound electrode body 40. Herein, the "spatial volume on the negative electrode side" is a spatial volume that is partitioned by a virtual plane V1 set in an end on the uncoated section 62 side of the negative electrode sheet 60 among the spatial volume excluding the wound electrode body 40 in the battery case 20. The "spatial volume on the negative electrode side" may be a spatial volume between an end on the uncoated section 62 side of the negative electrode sheet 60 and a sidewall of the battery case 20 among the spatial volume excluding the wound electrode body 40 in the battery case 20. The "spatial volume X on the negative electrode side" is the spatial volume partitioned by a virtual plane V1 set in an end on the uncoated section 62 side of the negative electrode sheet 60.

Further, the "spatial volume Y on the positive electrode side" is a spatial volume on a side where the uncoated section 52 of the positive electrode sheet 50 of the wound electrode body 40 is disposed in the direction of the winding axis WL of the wound electrode body 40. Herein, a "spatial volume on the positive electrode side" is a spatial volume that is partitioned by a virtual plane V2 set in an end on the uncoated section 52 side of the positive electrode sheet 50 among the spatial volume excluding the wound electrode body 40 in the battery case 20. The "spatial volume on the positive electrode side" may be a spatial volume between an edge on the uncoated section 52 side of the positive electrode sheet 50 and a sidewall of the battery case 20 among the spatial volume excluding the wound electrode body 40 in the battery case 20. The "spatial volume Y on the positive electrode side" is the spatial volume partitioned by the virtual plane V2 set in an end on the uncoated section 52 side of the positive electrode sheet 50.

Here, the positioning member 35 is a member for positioning the wound electrode body 40 to the battery case 20. In the present embodiment, the positive electrode terminal 23 and the negative electrode terminal 24 that are attached to the sealing plate 22 and to which the wound electrode body 40 is attached in the battery case 20 function as the positioning member 35.

In the lithium ion secondary battery 10A, the electrolytic solution is gradually decomposed during overcharging and a temperature thereof can rise due to the heat of decomposition. In this lithium ion secondary battery 10A, the spatial volume X on the negative electrode side is set larger than the spatial volume Y on the positive electrode side. Thus, in the lithium ion secondary battery 10A, the heat is difficult to accumulate on the negative electrode side. Therefore, a temperature increase in the corresponding site can be slowed down. Accordingly, in the lithium ion secondary battery 10A like this, a local temperature increase on the negative electrode side of the battery case 20 can be suppressed to a smaller level during overcharging.

Here, in the lithium ion secondary battery 10, the spatial volume X on the negative electrode side and the spatial volume Y on the positive electrode side may be, for example, about $2.1 \leq (X/Y)$. When the $(X/Y)$ is excessively large, for example, the resistance increase after the high-rate cycle test becomes larger in some cases. Therefore, the spatial volume X on the negative electrode side and the spatial volume Y on the positive electrode side may be, for example, about $(X/Y) \leq 5.7$. Further, for example, the positive electrode current collector foil 51 may be aluminum and the negative electrode current collector foil 61 may be copper. Further, like the embodiment described above, the battery case 20 may have a rectangular housing space, and the wound electrode body 40 may be housed in a flat state along one plane containing the winding axis WL. The wound electrode body 40 may be wound along one plane containing the winding axis WL and housed such that the winding axis and a sidewall of the battery case 20 intersect each other.

Here, regarding the lithium ion secondary battery 10A shown in FIG. 5, evaluation cells in which a ratio (X/Y) of the spatial volume X on the negative electrode side and the spatial volume Y on the positive electrode side was varied were prepared. Then, temperatures measured when the evaluation cells were charged up to 4.8 V and the resistance increase rates after the high-rate cycle test were investigated.

Herein, first, the evaluation cells prepared in test examples of Table 1 will be described. A positive electrode mixture was prepared for forming a positive electrode active material layer in a positive electrode. Here, the positive electrode mixture used a ternary lithium transition metal oxide ($LiNi_{1/3}Co_{1/3}Mn_{1/3}O_2$) as the positive electrode active material, acetylene black (AB) as the conductive material, and polyvinylidene fluoride (PVDF) as the binder, respectively. A mass ratio of the positive electrode active material, the conductive material, and the binder was set to positive electrode active material:conductive material:binder=90:8:2. These positive electrode active material, conductive material and binder were mixed with ion exchanged water, and the positive electrode mixture was prepared thereby. Then, the positive electrode mixture was sequentially coated on each of sides of a positive electrode current collector foil and dried, and a positive electrode (positive electrode sheet) in which the positive electrode active material layer is coated on each of both sides of the positive electrode current collector foil was prepared thereby.

Herein, an aluminum foil (thickness: 15 μm) was used as the positive electrode current collector foil. A coating amount of the positive electrode mixture on the positive electrode current collector foil was set to be substantially the same on both sides of the positive electrode current collector foil, and, to be 9.8 mg/cm$^2$ or more and 15.2 mg/cm$^2$ or less per one side of the positive electrode current collector foil after the positive electrode mixture was dried. Further, a mixture density of the positive electrode active material layer was set to 1.8 g/cm$^3$ or more and 2.8 g/cm$^3$ or less by rolling with a roller press machine after drying. In the evaluation cell illustrated here, the coating amount of the positive electrode mixture was set to be 11 mg/cm$^2$ per one side of the positive electrode current collector foil. The mixture density of the positive electrode active material layer after rolling was set to 2.2 g/cm$^3$.

A negative electrode mixture was prepared for forming a negative electrode active material layer in a negative electrode. Here, the negative electrode mixture used amorphous coat graphite as the negative electrode active material, carboxymethylcellulose (CMC) as a thickener, and the binder, respectively. As the binder, styrene-butadiene rubber (SBR) that is a rubber-based binder was used. A mass ratio of the negative electrode active material, the thickener (CMC), and the binder (SBR) was set to negative electrode active material:CMC:SBR=98:1:1. These negative electrode active material, CMC and SBR were mixed with ion exchanged water, and the negative electrode mixture was prepared thereby. Then, the negative electrode mixture was sequentially coated on each of sides of a negative electrode current collector foil and dried, and a negative electrode (negative electrode sheet) in which the negative electrode active material layer is coated on each of both sides of the negative electrode current collector foil was prepared thereby.

Herein, a copper foil (thickness: 10 μm) was used as the negative electrode current collector foil. A coating amount of the negative electrode mixture on the negative electrode current collector foil was set to be substantially the same on both sides of the negative electrode current collector foil, and, to be 4.8 mg/cm$^2$ or more and 10.2 mg/cm$^2$ or less per one side of the negative electrode current collector foil after the negative electrode mixture was dried. Further, a mixture density of the negative electrode active material layer was set to 0.8 g/cm$^3$ or more and 1.4 g/cm$^3$ or less by rolling with a roller press machine after drying. In the evaluation cell illustrated here, the coating amount of the negative electrode mixture was set to be 7.2 mg/cm$^2$ per one side of the negative electrode current collector foil. Further, the mixture density of the negative electrode active material layer after rolling was set to 1.1 g/cm$^3$.

As a base material of the separator, a porous sheet having a three-layer structure (PP/PE/PP) of polypropylene (PP) and polyethylene (PE) was properly selected.

As the evaluation cell, a flat rectangular evaluation cell was prepared. That is, the wound electrode body prepared with the positive electrode sheet, the negative electrode sheet and the separator was flatly pushed and bent and housed in a rectangular battery case, a nonaqueous electrolytic solution was injected therein and the battery case was sealed, and a flat rectangular evaluation cell was formed.

Further, except conditions that are specifically defined herein, the conditions of the wound electrode body (see FIG. 2) were set the same between the respective samples. For example, herein, the wound electrode body in a state of being flatly pushed and bent and being housed in the battery case 20 was set to have nearly a dimension as shown below. Here, the wound electrode body was set to have a width (L1): 125 mm, a height (L2): 55 mm, and a thickness (maximum thickness in a state of being flatly pushed and bent): 12 mm. Further, the positive electrode sheet was set to have the mixture density: 2.2 g/cm$^3$, a thickness: 65 μm (foil: 15 μm), a length: 3 m, a width: 115 mm (a2) and a coated width: 98 mm (a1). Further, the negative electrode sheet was set to have the mixture density: 1.1 g/cm$^3$, a thickness: 77 μm (foil: 10 μm), a length: 3 m, a width: 117 mm (b2) and a coated width: 102 mm (b1).

Figure 6:
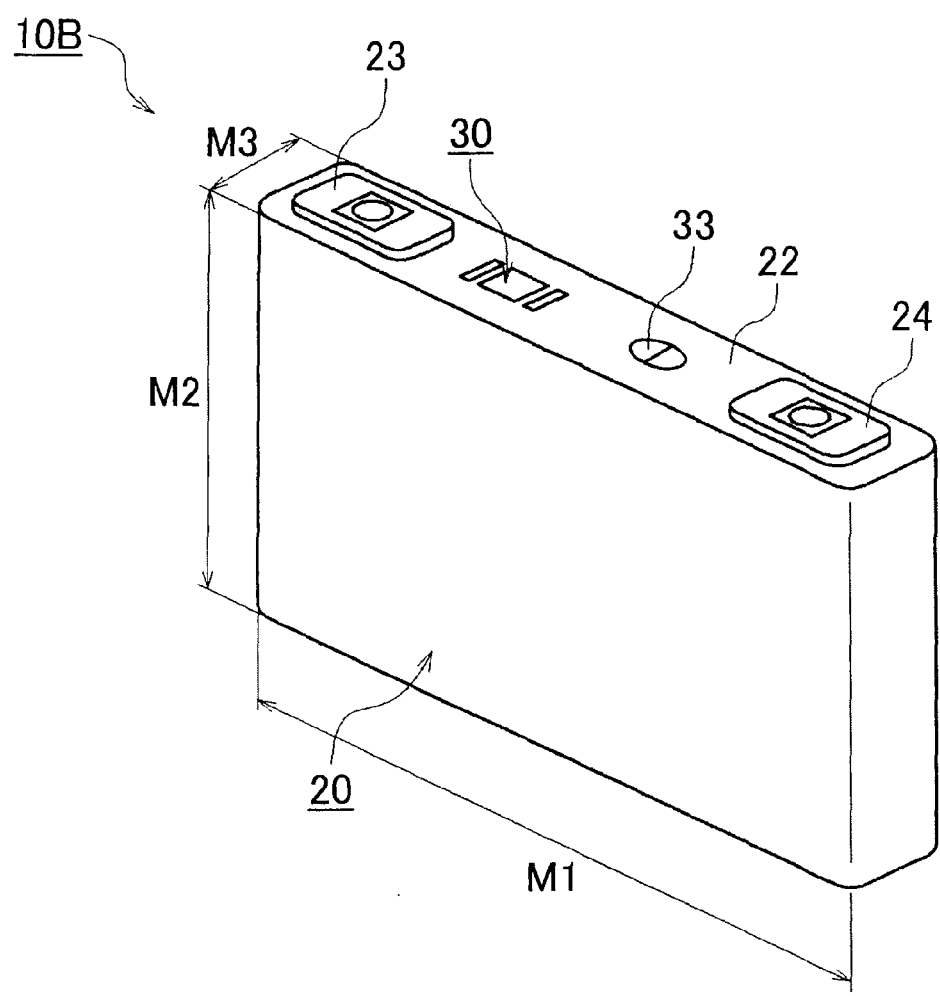
FIG. 6 is a perspective view of an evaluation cell.

FIG. 6 is a perspective view of an evaluation cell 10B. Here, the battery case 20 is made of aluminum. The battery case 20 roughly has a dimension such as shown below. Here, an external dimension of the battery case 20 had a length of a longer side (M1): 137 mm, a length of a shorter side (M2): 63.1 mm, and a thickness (M3): 13.3 mm. Further, an internal dimension of the battery case 20 had a length of a longer side: 135.6 mm, a length of a shorter side: 62.4 mm, and a thickness: 12.5 mm. Further, the evaluation cell here was formed in such a manner that a resinous plate was applied to each of two flat surfaces surrounded by the longer side (M1) and the shorter side (M2) of the battery case 20, and a metal plate was further applied from the above of the resinous plate. Then, on the outside of the battery case 20, a bolt was inserted in the metal plate and tightened with a nut. Here, in a state of 25° C. and SOC 60%, the surfaces concerned of the battery case 20 are restrained under pressure of 23 kgf/cm$^2$.

As the nonaqueous electrolytic solution, an electrolytic solution obtained by dissolving $LiPF_6$ as a lithium salt at 1.1 mol/L in a solvent in which ethylene carbonate (EC), dimethyl carbonate (DMC) and ethylmethyl carbonate (EMC) were mixed at a predetermined volume ratio (EC:DMC: EMC=3:4:3) was used.

Here, the prepared evaluation cell was subjected to, for example, a predetermined conditioning step, and the temperature increase rate when charged to 4.8 V and the resistance increase rate after the high-rate cycle test were evaluated.

Next, the evaluation cell formed as described above was, after injection of the electrolytic solution, left for about 10 hours, and initial charging was performed. The conditioning step is performed according to the following procedures 1 and 2. Procedure 1: After constant current charging is performed at 1.5 C up to 4 V, the operation is suspended for 5 minutes. Procedure 2: After the procedure 1, when charging is performed for 1.5 hours at a constant voltage or a charging current becomes 0.1 A, charging is stopped and the operation is suspended for 5 minutes.

Next, a rated capacity of the evaluation cell after the conditioning step described above is measured according to the following procedures 1 to 3 at 25° C. in a voltage range of 3.0 V to 4.1 V. Procedure 1: After reaching 3.0 V by a constant current discharging at 1 C, a constant voltage discharging is performed for two hours and, after that, the operation is suspended for 10 seconds. Procedure 2: After reaching 4.1 V by a constant current charging at 1 C, a constant voltage charging is performed for 2.5 hours and, after that, the operation is suspended for 10 seconds. Procedure 3: After reaching 3.0 V by a constant current discharging at 0.5 C, a constant voltage discharging is performed for 2 hours and, after that, the operation is stopped for 10 seconds. Rated capacity: a discharge capacity (CCCV discharge capacity) in the discharging from the constant current discharging to the constant voltage discharging in the Procedure 3 is taken as the rated capacity. In this evaluation cell, the rated capacity becomes about 4.0 Ah.

An SOC adjustment is performed according to the following procedures 1 and 2. Here, the SOC adjustment may be performed after the conditioning step and measurement of the rated capacity, which were described above. Further, herein, in order to make an influence due to the temperature constant, the SOC adjustment is performed under a temperature environment of 25° C. For example, when the SOC is adjusted to 60%, the following procedure is used. Procedure 1: A constant current charging at 1 C is performed from 3 V, and a state of charge of about 60% (SOC 60%: 3.73 V) of the rated capacity is achieved. Procedure 2: After the Procedure 1, a constant voltage charging is performed for 2.5 hours. Thus, the evaluation cell can be adjusted to a state of charge of SOC 60%. Herein, a case where the SOC is adjusted to 60% was described. By varying the state of charge in the Procedure 1, the evaluation cell can be adjusted to an optional state of charge. For example, when the SOC is adjusted to 79%, in the Procedure 1, the evaluation cell may be set to a state of charge of 79% of the rated capacity.

Herein, an evaluation cell in which the SOC was adjusted to 60% after conditioning under a temperature environmental atmosphere of 25° C. was prepared. Then, according to the following procedures I. to III., a temperature during 4.8 V charging was measured. I. A temperature sensor is attached. II. The evaluation cell is set to a state of charge of 4.8 V. III. A temperature during 4.8 V charging is measured.

Here, a temperature sensor is attached to a predetermined temperature sensor attachment position F (see FIG. 5) of a side surface on the negative electrode side of the battery case 20 of the evaluation cell (procedure I.). Then, under an atmospheric environment of 25° C., a constant current charging (CC charging) at ⅓ C is performed until a voltage between positive electrode and negative electrode terminals of the evaluation cell becomes 4.8 V, subsequently a constant voltage charging (CV charge) is performed until a total charging time becomes 1.5 hours (Procedure II.). After one minute suspension, a temperature of the temperature sensor attachment position F is measured with the temperature sensor (procedure III.). The temperature (° C.) measured according to such procedure III is taken as "a temperature during 4.8 V charging".

Here, the high-rate resistance increase rate (%) in Table 1 is an IV resistance increase rate before and after the high-rate cycle test such as shown below. High-load characteristics of the evaluation cell are evaluated by such IV resistance increase rate.

Here, for the high-rate cycle test, an evaluation cell of which SOC was adjusted to 60% after conditioning under a temperature environmental atmosphere of 25° C. was prepared. Then, the high-rate cycle test where the following procedures I to IV are repeated a predetermined number of times (herein, 4000 cycles) was performed. I. A constant current discharging at 75 A for 40 seconds (CC discharge). II. A suspension for 5 minutes. III. A constant current charging at 10 A for 300 seconds (CC charge). IV. A suspension for 5 seconds (procedures of I to IV are repeated at 4000 cycles.)

Herein, before and after the high-rate cycle test described above, an IV resistance of the evaluation cell in a state of charge of SOC 60% under an environment of 25° C. was measured.

According to the high-rate cycle test described above, the IV resistance of the evaluation cell increases. A resistance increase rate Z (%) is evaluated by Z (%)={Zb/Za}×100 with an IV resistance Za measured before the high-rate cycle test and an IV resistance Zb measured after the high-rate cycle test described above. That is, herein, a magnitude of the IV resistance Zb measured after the high-rate cycle test with respect to the IV resistance Za measured before the high-rate cycle test is evaluated.

Regarding the IV resistance, an IV resistance of the evaluation cell in a state of charge of SOC 60% under an environment of 25° C. was measured. Here, the IV resistance is obtained in such a manner that a constant current discharging is performed at a predetermined current value (I) for 10 seconds, a voltage (V) after the discharging is measured, respectively. Then, after the discharging, the predetermined current values (I) and the voltages (V) are plotted with I in an X axis and with V in a Y axis. Then, based on the plot obtained by the respective dischargings, an approximate linear line is drawn, and a gradient thereof is taken as the IV resistance. Herein, based on the voltages (V) after the respective dischargings where constant current dischargings were performed at current values of 0.3 C, 1 C and 3 C, the IV resistance (mΩ) was obtained.

Figure 7:
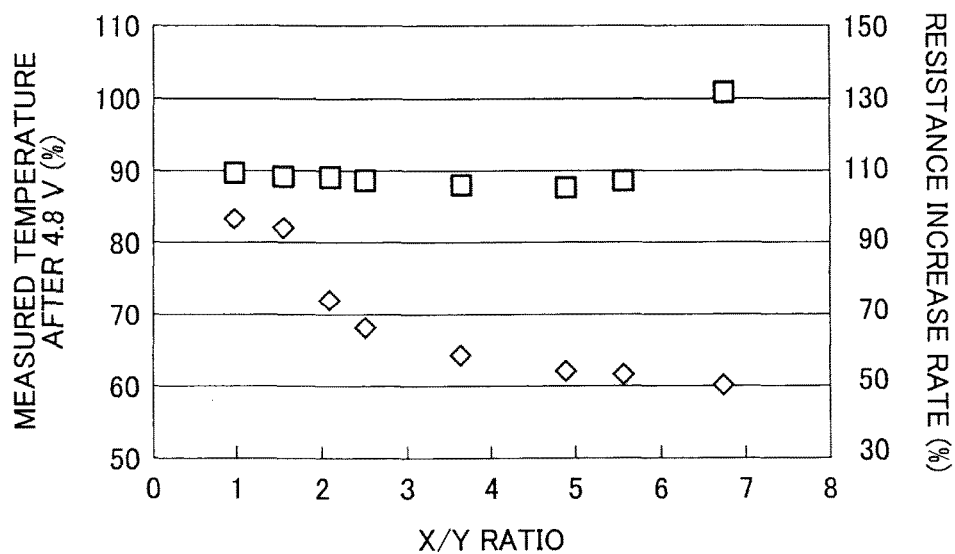
FIG. 7 is a graph that shows an evaluation of the evaluation cell.

The respective evaluation cells and evaluations thereof are as shown in Table 1 and FIG. 7.

TABLE 1

| | Ratio (X/Y) | Temperature after 4.8 V (° C.) | High-rate Resistance Increase Rate (%) |
|---|---|---|---|
| Sample 1 | 1.00 | 83.6 | 109.7 |
| Sample 2 | 1.56 | 82.7 | 108.8 |
| Sample 3 | 2.12 | 72.5 | 108.3 |
| Sample 4 | 2.54 | 68.3 | 108.0 |
| Sample 5 | 3.67 | 64.5 | 106.2 |
| Sample 6 | 4.93 | 62.2 | 105.7 |

TABLE 1-continued

|  | Ratio (X/Y) | Temperature after 4.8 V (° C.) | High-rate Resistance Increase Rate (%) |
|---|---|---|---|
| Sample 7 | 5.62 | 61.9 | 107.9 |
| Sample 8 | 6.79 | 60.6 | 132.8 |

Herein, evaluation cells that are different in a ratio (X/Y) of the spatial volume X on the negative electrode side and the spatial volume Y on the positive electrode side were prepared. Sample 1 to Sample 8 shown in Table 1 are evaluation cells that are different in a ratio (X/Y) of the spatial volume X on the negative electrode side and the spatial volume Y on the positive electrode side, respectively. The ratio (X/Y) is a value obtained by dividing the spatial volume X on the negative electrode side by the spatial volume Y on the positive electrode side.

Here, the evaluation cell of Sample 1 has the wound electrode body 40 disposed at the center of the battery case 20. In Sample 2 to Sample 8, a position of the wound electrode body 40 housed in the battery case 20 is gradually displaced toward (offset to) the positive electrode side and the spatial, volume X on the negative electrode side is gradually increased with respect to the spatial volume Y on the positive electrode side thereby (see FIG. 5).

As shown in Table 1, herein, for example, in Sample 1, the spatial volume X on the negative electrode side and the spatial volume Y on the positive electrode side are the same ((X/Y)=1). In Sample 2, the spatial volume X on the negative electrode side is slightly larger than the spatial volume Y on the positive electrode side ((X/Y)=1.56). Thus, when the ratio (X/Y) is about 1 to 1.56, a tendency that the local temperature increase during overcharging is large such as 80° C. or more during 4.8 V charging was found. Now, in Sample 1, a temperature during 4.8 V charging was 83.6° C. In Sample 2, a temperature during 4.8 V charging was 82.7° C.

Further, for example, like Sample 3, when the spatial volume X on the negative electrode side becomes larger than the spatial volume Y on the positive electrode side, a temperature during 4.8 V charging decreases to about 70° C. (72.5° C. in Sample 3), that is, a tendency that the local temperature increase during overcharging becomes smaller was found. Further, like Samples 4 to 7, when the spatial volume X on the negative electrode side becomes further larger than the spatial volume Y on the positive electrode side, a temperature during 4.8 V charging becomes less than 70° C., that is, a tendency that the local temperature increase during overcharging becomes further smaller was found.

Here, in Sample 4, the ratio (X/Y) was 2.54 and the temperature during 4.8 V charging was 68.3° C. In Sample 5, the ratio (X/Y) was 3.67 and the temperature during 4.8 V charging was 64.5° C. In Sample 6, the ratio (X/Y) was 4.93 and the temperature during 4.8 V charging was 62.2° C. In Sample 7, the ratio (X/Y) was 5.62 and the temperature during 4.8 V charging was 61.9° C.

By contrast, when the ratio (X/Y) is made excessively large, a tendency that the resistance increase rate (%) before and after high-rate cycle test becomes larger is found. For example, in Samples 1 to 7, the resistance increase rate (%) before and after the high-rate cycle test is less than about 110%. On the other hand, in Sample 8, the ratio (X/Y) is such high as 6.79, and the resistance increase rate (%) before and after the high-rate cycle test becomes remarkably high such as 132.8%.

Thus, in the lithium ion secondary battery 10A, it is desirable to make the spatial volume X on the negative electrode side larger than the spatial volume Y on the positive electrode side, as shown in FIG. 5, from the viewpoint of suppressing the local temperature increase during overcharging, in particular, on the negative electrode side to a low level. Here, the ratio (X/Y) of the spatial volume X on the negative electrode side and the spatial volume Y on the positive electrode side may be preferably, for example, about 2.1≤(X/Y), and more preferably about 2.5≤(X/Y). Still further, from the viewpoint of suppressing the resistance increase rate (%) before and after the high-rate cycle test to a low level, the ratio (X/Y) of the spatial volume X on the negative electrode side and the spatial volume Y on the positive electrode side may be, for example, about (X/Y)≤5.7.

Further, here, the lithium ion secondary battery 10A has the positive electrode current collector foil 51 made of aluminum and the negative electrode current collector foil 61 made of copper, that is, the thermal conductivity is larger in the negative electrode current collector foil 61 than that of the positive electrode current collector foil 51. When the thermal conductivity of the negative electrode current collector foil 61 is larger than that of the positive electrode current collector foil 51, a tendency that a temperature on the negative electrode side locally increases during overcharging becomes remarkable. In particular, when the charging is performed up to a high potential of about 4.8 V, in the wound electrode body 40, a state where many lithium ions are contained in the negative electrode active material in the negative electrode active material layer 63 is generated. Therefore, decomposition of the electrolytic solution tends to proceed in the negative electrode active material layer 63 and in the proximity thereof. Then, the heat generated accompanying the decomposition of the electrolytic solution in the negative electrode active material layer 63 and in the proximity thereof tends to be transmitted much to the negative electrode terminal 24 via the negative electrode current collector foil 61. Therefore, a structure of the nonaqueous electrolyte secondary battery according to the present invention is particularly suitable for the lithium ion secondary battery 10A in which the thermal conductivity of the negative electrode current collector foil 61 is larger than that of the positive electrode current collector foil 51. Further, here, the lithium ion secondary battery 10A was illustrated as a nonaqueous electrolyte secondary battery. The tendency that the temperature on the negative electrode side locally increases is induced by the heat generation accompanying the decomposition of the electrolyte during overcharging. Therefore, the nonaqueous electrolyte secondary battery according to the present invention is not, unless clearly stated otherwise, limited to the lithium ion secondary battery 10A. As the lithium ion secondary battery according to the present invention, for example, a sodium ion secondary battery or a lithium ion polymer secondary battery may be used.

Figure 8:
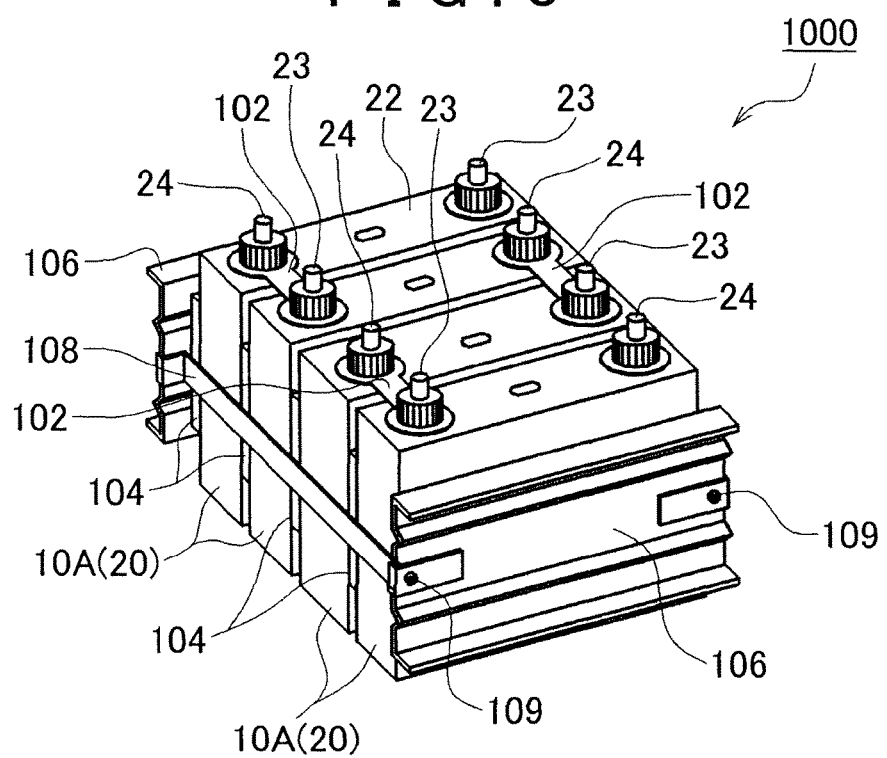
FIG. 8 is a perspective view that schematically shows a structure of a pack battery.

Next, when a pack battery is assembled by using the lithium ion secondary batteries 10A described above, among the pack battery, in the lithium ion secondary batteries 10A that are adjacently assembled, the wound electrode bodies 40 housed in the battery case 20 may be offset each other along the direction of the winding axis WL. For example, FIG. 8 is a perspective view that schematically shows a structure of a pack battery 1000. Specifically, in the pack battery 1000 shown in FIG. 8, with the lithium ion secondary battery 10A shown in FIG. 5 as a unit cell, a plurality thereof is assembled.

For example, as shown in the drawing, the respective unit cells 10A are electrically connected in series. Specifically, on a top surface (that is, the sealing plate 22) of the battery case 20 of each of the unit cells 10A, the positive electrode terminal 23 electrically connected with the positive electrode of the electrode body housed in the battery case 20 and the negative electrode terminal 24 electrically connected with the negative electrode of the electrode body are disposed. Between adjacent unit cells 10A, one positive electrode terminal 23 and the other negative electrode terminal 24 are electrically connected with a proper connector 102.

On both external sides of a unit cell group including a plurality pieces of the unit cells 10A arranged as described above, end plates 106 are disposed, respectively, and beam materials 108 are attached on both side surfaces of the unit cell group along an arrangement direction thereof so as to crosslink the pair of the end plates 106 and 106. Each end of the beam materials 108 is tightened and fixed to the end plate 106 by a screw 109. Such unit cells 10A are connected in series and constrained (fixed). Herein, in a state of 25° C. and 60% SOC, the battery case 20 is constrained under pressure of 23 kgf/cm².

In one preferable aspect of the pack battery 1000, as shown in FIG. 8, between each of a plurality of the unit cells 10A arranged in a predetermined direction, an interval holding sheet 104 having a predetermined shape is disposed. Such interval holding sheet 104 is preferable to be a material (for example, made of a metal having excellent thermal conductivity or a light and hard synthetic resin such as polypropylene and the like) and/or a shape that can function as a heat dissipation member for dissipating heat generated in each of the unit cells 10A during use.

Figure 9:
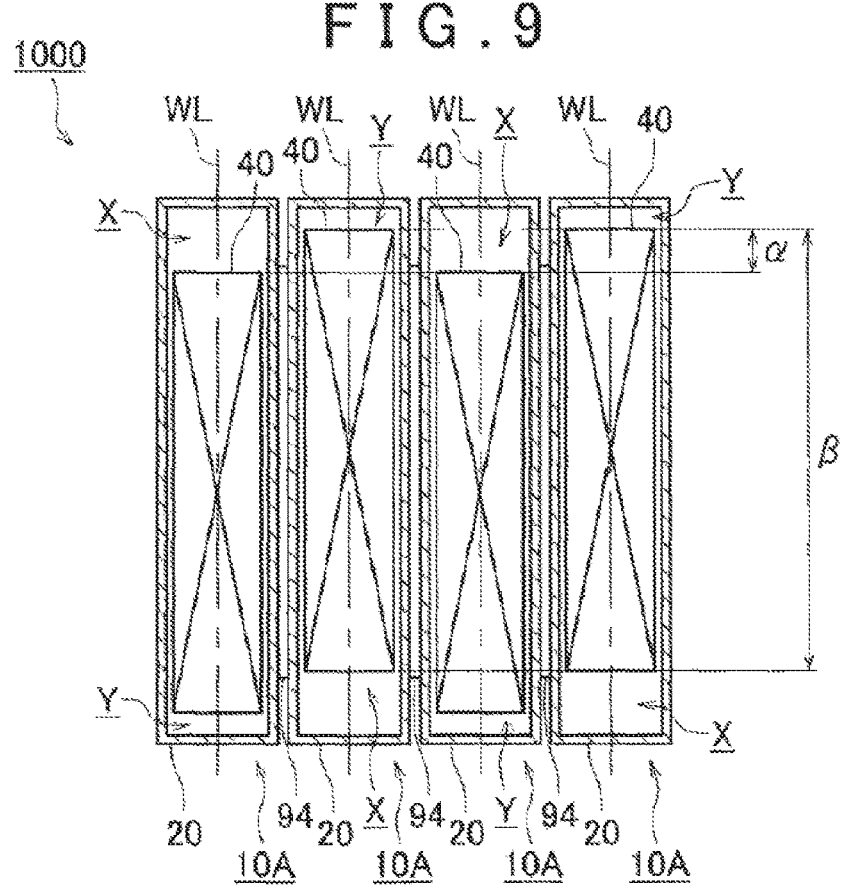
FIG. 9 is a schematic view of the pack battery.

According to the present embodiment, in the lithium ion secondary battery 10A, the wound electrode body 40 housed in the battery case 20 is positionally offset toward the positive electrode side. Therefore, the spatial volume X on the negative electrode side is larger than the spatial volume Y on the positive electrode side. Here, FIG. 9 is a schematic view of the pack battery 1000. As shown in FIG. 9, the lithium ion secondary batteries 10A are superposed with surfaces having a larger width of the battery case 20 faced with each other. Here, the surface having a larger width of the battery case 20 is a surface surrounded by a long side (M1) and a short side (M2) of the rectangular battery case 20 (see FIG. 6).

Here, in the lithium ion secondary batteries 10A that are adjacently assembled, as shown in FIG. 9, adjacent wound electrode bodies 40 housed in the battery case 20 are offset each other in the direction of the winding axis WL. Each of the lithium ion secondary batteries 10A of the pack battery 1000 has the spatial volume X on the negative electrode side larger than the spatial volume Y on the positive electrode side. Each of the lithium ion secondary batteries 10A of the pack battery 1000 is assembled such that the spatial volume X on the negative electrode side abuts the spatial volume Y on the positive electrode side in adjacent lithium ion secondary batteries 10A.

Each of the lithium ion secondary batteries 10A of this pack battery 1000 has the spatial volume X on the negative electrode side larger than the spatial volume Y on the positive electrode side. Therefore, in each of the lithium ion secondary batteries 10A, local heat generation in an overcharging state of, for example, about 4.8 V can be suppressed to a low level. Therefore, also as the entire pack battery 1000, the local heat generation in an overcharging state of, for example, about 4.8 V can be suppressed to a low level.

Further, in this pack battery 1000, the wound electrode bodies 40 of adjacently assembled lithium ion secondary batteries 10A are offset in the direction of the winding axis WL. According to the knowledge of the present inventors, when the wound electrode bodies 40 of the adjacently assembled lithium ion secondary batteries 10A are offset in the direction of the winding axis WL, there is a tendency that the capacity retention rate of the pack battery 1000 is maintained at a high level.

Figure 10:
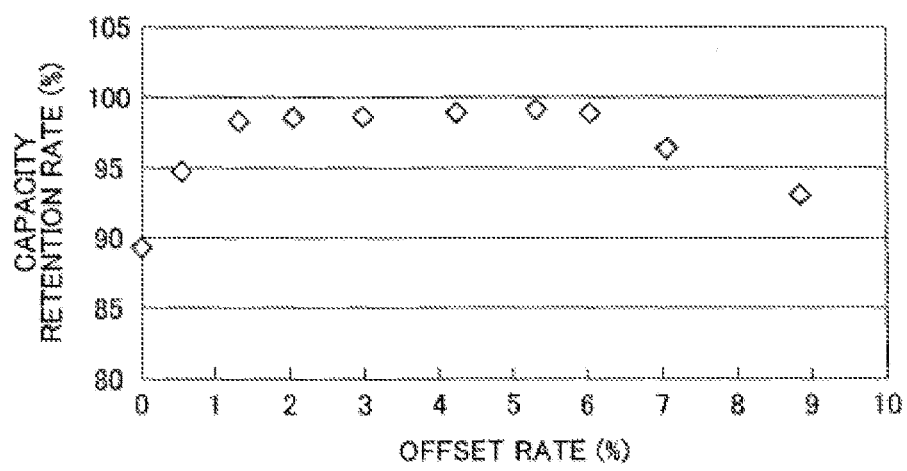
FIG. 10 is a graph that shows evaluation of a pack battery for evaluation.

Here, the present inventors prepared the pack batteries 1000 in which an offset rate A defined by a width $\beta$ in the direction of the winding axis of the wound electrode body 40 of the lithium ion secondary battery 10A that is adjacently assembled and an amount of offset $\alpha$ in the direction of the winding axis of the adjacent wound electrode bodies ($A=\alpha/\beta \times 100$) is variously changed and evaluated performances thereof:

FIG. 10 shows evaluations of the respective evaluation pack batteries. Here, the "offset rate A=0" means that the wound electrode bodies 40 of the lithium ion secondary battery 10A that are adjacently assembled are not offset in the direction of the winding axis WL. Further, it means that the larger the offset rate A becomes, the larger the wound electrode bodies 40 of the lithium ion secondary batteries 10A that are adjacently assembled are offset in the direction of the winding axis WL.

With the evaluation pack batteries that have different offset rates A, the capacity retention rates were measured. Specifically, herein, the high-rate cycle test was performed under a temperature environment of −30° C., and the capacity retention rate (%) between before and after the high-rate cycle test was evaluated.

Here, the reason why the test was performed under a temperature environment of −30° C. is because the lower the temperature is set, the more the metallic lithium tends to precipitate in the high-rate cycle test and the more the capacity tends to decrease by the high-rate cycle test. That is, the decrease in the capacity retention rate (%) here is considered caused by precipitation of the metallic lithium.

Here, the capacity retention rate (the capacity retention rate after cycle test) is obtained as a ratio (capacity after cycle test)/(initial capacity) of an initial capacity of an evaluation pack battery that is adjusted to the predetermined state of charge and a capacity of the evaluation pack battery after the predetermined charging and discharging cycle test (hereinafter, optionally referred to as "capacity after cycle test"). The capacity retention rate after cycle test is represented by "capacity retention rate after cycle test"=(capacity after cycle test)/(initial capacity)×100(%).

Here, the initial capacity is measured, for example, in such a manner that an evaluation pack battery that was adjusted to the predetermined state of charge is charged at a constant current of 1 C until a voltage between terminals becomes 4.1 V under a temperature condition of 25° C., subsequently a constant voltage charging is performed until a total charging time becomes 2.5 hours (CC-CV charging), after 10 minute suspension after completion of the charging, at 25° C., a constant current discharging at 0.33 C (⅓ C) is performed from 4.1 V to 3.0 V, subsequently, a constant voltage discharging is performed until a total discharging time becomes 4 hours. The discharging capacity at this time was taken as an initial capacity Q1 [Ah] of each of the batteries.

The "capacity after cycle test" is measured in such a manner that the evaluation cell is subjected to the predetermined charging/discharging cycle test under the predetermined temperature environment, then, based on the evaluation cell after charging/discharging cycle test, according to the measurement of the "initial capacity" described above, a charging capacity is measured under a temperature environment of 25° C. Here, the measured "discharge capacity" is taken as the "capacity after cycle test".

As the capacity retention rate here, in particular, a capacity retention rate after charging/discharging cycle test under a low temperature environment of about −30° C. is considered important. Therefore, specifically, the "capacity after cycle test" was measured after the predetermined charging/discharging cycle was performed the predetermined number of cycles (herein, 6000 cycles) under the temperature environment of −30° C.

Here, the high-rate cycle test was performed as shown below. An evaluation cell of which SOC was adjusted to 79% was prepared after conditioning under a temperature environmental atmosphere of 25° C. Then, the high-rate cycle test in which the following procedures I to III are repeated the predetermined number of cycles (herein, 6000 cycles) under a temperature environment atmosphere of −30° C. was performed. I. A constant current discharging at 40 C for 0.1 seconds (CC discharging), II. A constant current charging at 0.4 C for 10 seconds (CC charge) (that is, charging an amount of capacity discharged in I.), III. A suspension for 29 seconds (Procedures of I to III are repeated 6000 cycles.)

With such capacity retention rate (capacity retention rate after charging/discharging cycle test under a low temperature environment), the relationship between the offset rates A and the capacity retention rates under a low temperature environment of the evaluation pack batteries 1000 having different offset rate A was evaluated.

As a result thereof, as shown in FIG. 10, in comparison with the case where the offset rate A is zero, the larger the offset rate A becomes, the higher the capacity of the pack battery is maintained. That is, a tendency that in comparison with the case where the offset rate A is zero, when the offset rate A becomes larger, the capacity retention rate after charging/discharging cycle test under a low temperature environment is improved was found. Further, there was a tendency that when the offset rate A was excessively large, the capacity retention rate after charging/discharging cycle test under a low temperature environment decreased.

The present inventors consider the reason of the tendency described above as follows. In the high-rate charging/discharging cycle test, a phenomenon in which the wound electrode body 40 repeats expansion and contraction occurs. When the phenomenon in which the wound electrode body 40 repeats the expansion and contraction occurs, the wound electrode body 40 works like a pump and the electrolytic solution in the wound electrode body 40 decreases thereby:

That is, each of the unit cells of the pack battery 1000 is restrained by the end plates 106 and 106 and interval holding sheets 104. At this time, regarding the high-rate charging/discharging cycle test, when the wound electrode body 40 expands in the battery case 20, pressure of the electrolytic solution in the wound electrode body 40 increases, and the electrolytic solution in the wound electrode body 40 is ejected. On the other hand, when the wound electrode body 40 contracts, the pressure of the electrolytic solution in the wound electrode body 40 is alleviated, the electrolytic solution intrudes into the wound electrode body 40, and the electrolytic solution returns into the wound electrode body 40. However, when the pressure of the electrolytic solution in the wound electrode body 40 becomes excessively high at the time when the wound electrode body 40 expands, the electrolytic solution in the wound electrode body 40 is strongly ejected, and the electrolytic solution in the wound electrode body 40 remarkably decreases thereby. In some cases, even when the wound electrode body 40 contracts, the electrolytic solution does not sufficiently return into the wound electrode body 40.

In particular, under a low temperature environment of about −30° C., in the lithium ion secondary battery 10A, a migration speed (reaction speed) of the lithium ion decreases and lithium ions tend to precipitate as metallic lithium. Further, the more the metallic lithium precipitates, the larger a degree of capacity degradation of the pack battery 1000 becomes. Therefore, when the high-rate charging/discharging cycle test is performed under a low temperature environment of about −30° C. and the capacity degradation (capacity retention rate) is evaluated, characteristics of the high-rate charging/discharging cycle test can more remarkably be evaluated.

Here, as shown in FIG. 10, when the offset rate A is zero, in the high-rate cycle test at −30° C. described above, the capacity retention rate of the pack battery 1000 became 90%, that is, the capacity decrease was about 10%. Further, at this time, in the lithium ion secondary batteries 10A of the pack battery 1000, precipitation of metallic lithium was found in the wound electrode body 40. In particular, at this time, the metallic lithium remarkably precipitated on a flat surface of the wound electrode body 40. Regarding such a phenomenon, the present inventors consider that since the wound electrode bodies 40 of adjacently assembled lithium ion secondary batteries 10A are not moderately offset in the direction of the winding axis, and, in the expansion and contraction of the wound electrode bodies 40 in the high-rate cycle test, the pressure acting on the electrolytic solution in the wound electrode body 40 could not be alleviated.

Further, in comparison with the case where the offset rate A is zero, when the offset rate A becomes larger, in the high-rate cycle test of −30° C. described above, the capacity retention rate of the pack battery 1000 becomes about 97%, that is, the capacity was substantially maintained.

Here, when the offset rate A becomes larger, the amount of offset α in the direction of the winding axis of the wound electrode body 40 of the lithium ion secondary battery 10A that is adjacently assembled becomes larger. That is, when the offset rate A becomes larger, the wound electrode body 40 of the lithium ion secondary battery 10A that is adjacently assembled is moderately displaced in the direction of the winding axis. When the wound electrode body 40 of the lithium ion secondary battery 10A that is adjacently assembled is moderately displaced in the direction of the winding axis, the restraint of the wound electrode body 40 is moderately alleviated in each of batteries of the pack battery 1000. Therefore, in the high-rate cycle test at −30° C., the capacity retention rate of the pack battery 1000 can be maintained higher than about 97%.

When the offset rate A becomes excessively larger, in the high-rate cycle test at −30° C. described above, the capacity retention rate of the pack battery 1000 decreases to about 95%. In this case, in the lithium ion secondary batteries 10A that are adjacently assembled, it was found that, in particular in sites where the wound electrode bodies 40 are displaced, the metallic lithium precipitated.

In the phenomenon like this, when the offset rate A becomes excessively large, the amount of offset α in the direction of the winding axis of the wound electrode bodies 40 of the lithium ion secondary batteries 10A that are adjacently assembled becomes larger. In this case, in sites where the wound electrode bodies 40 are largely offset, the wound electrode bodies 40 become a state where the restraint is excessively alleviated. In the site where the restraint of the wound electrode body 40 is excessively alleviated, an interval between the positive electrode sheet and the negative electrode sheet of the wound electrode body 40 becomes larger, and the resistance of the lithium ion secondary battery 10A becomes larger thereby. The present inventors consider that this induces the precipitation of lithium.

From the inference like this, in the pack battery 1000, in the lithium ion secondary batteries 10A that are adjacently assembled, the offset rate A ($A=\alpha/\beta \times 100$) defined with a width $\beta$ in the direction of the winding axis of the wound electrode body 40 and an amount of offset $\alpha$ in the direction of the winding axis of the wound electrode body 40 may be about $1.3 \leq A \leq 6.0$.

Like this, in the pack battery 1000 proposed here, in the lithium ion secondary batteries 10A as a unit battery, the wound electrode bodies 40 housed in the battery case 20 are offset each other in the direction of the winding axis WL. Each of the lithium ion secondary batteries 10A of the pack battery 1000 has the spatial volume X on the negative electrode side larger than the spatial volume Y on the positive electrode side. In each of the lithium ion secondary batteries 10A, the local heat generation in an overcharging state of about 4.8 V, for example, can be suppressed to a low level. Therefore, also as the pack battery 1000 as a whole, the local heat generation in an overcharging state of about 4.8 V, for example, can be suppressed to a low level.

Further, each of the lithium ion secondary batteries 10A of the pack battery 1000 is assembled such that the spatial volume X on the negative electrode side abuts the spatial volume Y on the positive electrode side in an adjacent lithium ion secondary battery 10A. The wound electrode bodies 40 of the lithium ion secondary batteries 10A that are adjacently assembled are moderately offset in the direction of the winding axis WL. According to the knowledge which the present inventors acquired, in such pack battery 1000, there is a tendency that the local heat generation on the negative electrode side in an overcharging state can be suppressed to a low level and the capacity retention rate of the pack battery 1000 can be maintained at a high level.

In the above, herein, a pack battery that uses the lithium ion secondary battery 10A as a unit cell, which has the spatial volume X on the negative electrode side larger than the spatial volume Y in the positive electrode side was described.

As described above, in the pack battery 1000, by moderately offsetting the wound electrode bodies 40 of the lithium ion secondary batteries 10A that are adjacently assembled in the direction of the winding axis WL, the capacity retention rate of the pack battery 1000 tends to be maintained at a high level. When an attention is paid to such tendency, the unit cell of the pack battery may not have the spatial volume X on the negative electrode side larger than the spatial volume Y on the positive electrode side.

A graphical representation from the viewpoint that the capacity retention rate of the pack battery 1000 can be maintained at a high level is omitted. For example, in the unit cell of the pack battery, the spatial volume Y on the positive electrode side may be larger than the spatial volume X on the negative electrode side. That is, in a lithium ion secondary battery that forms a unit cell of the pack battery 1000, a wound electrode body 40 may be disposed by biasing toward one side in the direction of the winding axis in the battery case. In this case, a plurality of the lithium ion secondary batteries may be superposed such that a direction in which the wound electrode body 40 is offset in the battery case may alternately change.

Figure 11:
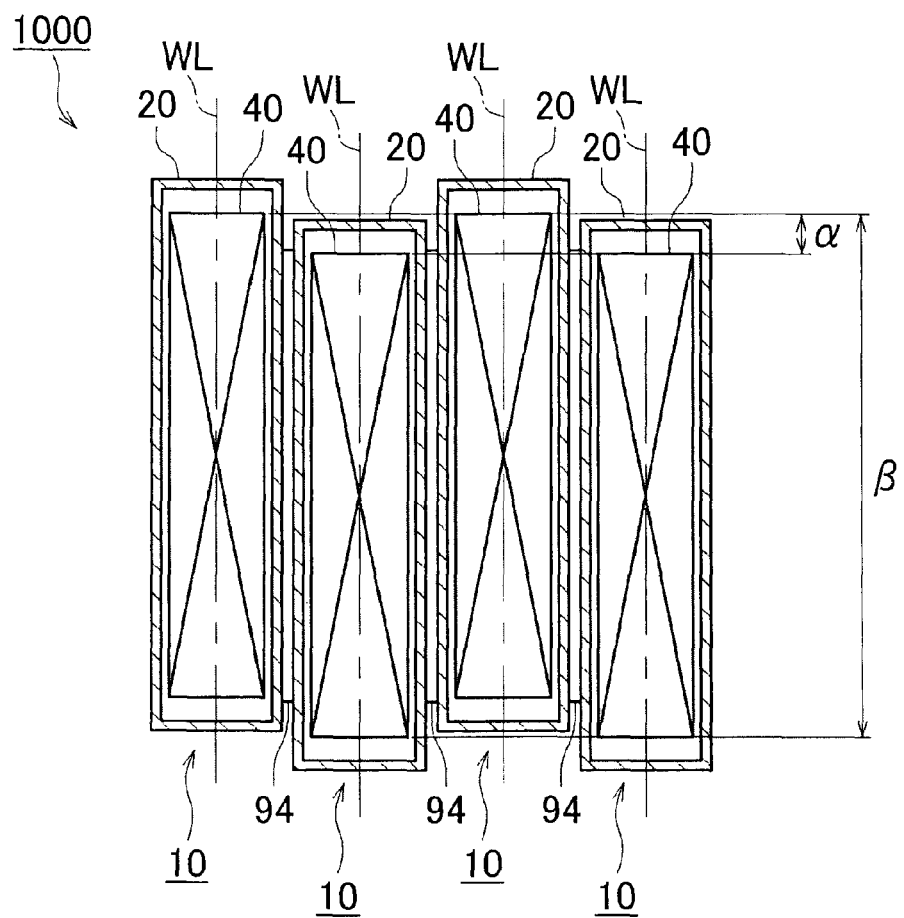
FIG. 11 is a schematic view that shows another form of the pack battery.

Further, FIG. 11 schematically shows another mode of the pack battery 1000. Here, in a unit cell 10 of a pack battery, as shown in FIG. 11, the wound electrode body 40 is disposed in a predetermined position of the battery case 20. Here, the wound electrode body 40 is disposed at a nearly center of the rectangular battery case 20 in the direction of the winding axis WL. In a mode shown in FIG. 11, in the pack battery 1000, the battery cases 20 of the lithium ion secondary batteries 10 that are adjacently assembled are offset in the direction of the winding axis WL of the wound electrode body 40 housed in the battery case 20. Thus, in the pack battery 1000, the wound electrode bodies 40 of the lithium ion secondary batteries 10 that are adjacently assembled are moderately offset in the direction of the winding axis WL. The lithium ion secondary batteries 10 that are adjacently assembled may be moderately offset in the direction of the winding axis WL. Also in the pack battery 1000 having such structure, the capacity retention rate tends to be maintained at a high level.

According to the knowledge of the present inventors, also in such structure, in the pack battery 1000, the lithium ion secondary batteries 10 that are adjacently assembled may have the offset rate A ($A=\alpha/\beta \times 100$) defined with a width $\beta$ in the direction of the winding axis of the wound electrode body 40 and an amount of offset $\alpha$ in the direction of the winding axis of the adjacent wound electrode bodies 40 of about $1.3 \leq A \leq 6.0$.

In the above, the lithium ion secondary battery and the pack battery according to one embodiment of the present invention were described. The present invention is not restricted to any one of the embodiments described above and can be variously modified.

Figure 12:
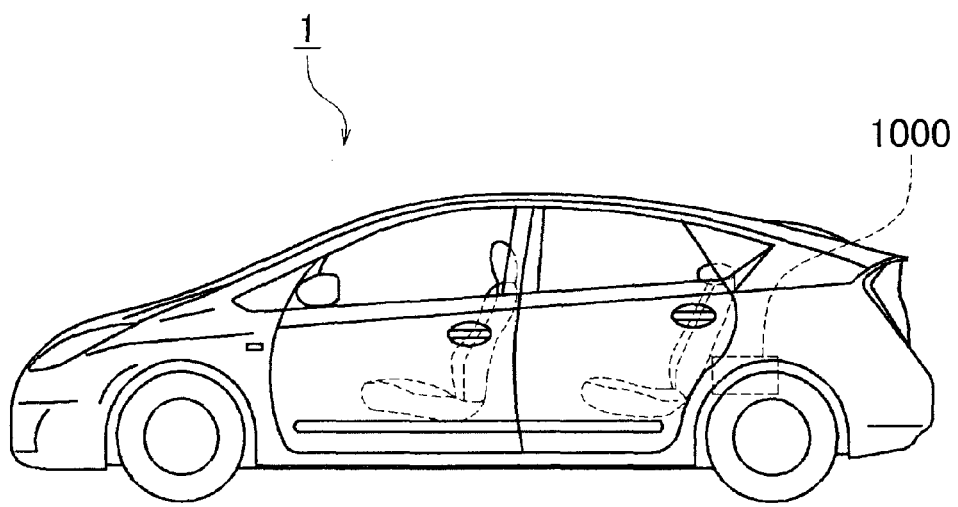
FIG. 12 is a diagram that shows a vehicle on which the secondary battery (pack battery) is mounted.

For example, the lithium ion secondary battery disclosed here can suppress the temperature increase rate particularly during overcharging to a low level. Thus, the lithium ion secondary battery having high safeness and stable performance can be provided. Therefore, for example, as shown in FIG. 12, the lithium ion secondary battery disclosed here is particularly suitable as the vehicle driving battery 1000 for which high safeness and stable performance are required. Here, the vehicle driving battery 1000 can have a form of a pack battery that is formed by connecting a plurality of the lithium ion secondary batteries 10 described above in series. In a vehicle 1 having such vehicle driving battery 1000 as a power source includes typically an automobile, in particular, an automobile provided with a motor such as a hybrid vehicle (including a plug-in hybrid vehicle) and an electric vehicle.

Further, herein, the lithium ion secondary battery and the pack battery that includes the lithium ion secondary battery as a unit cell were illustrated. The structure of the lithium ion secondary battery proposed here can be applied also to other nonaqueous electrolyte secondary batteries that have the same inner structure. Further, the structure regarding the pack battery proposed here can be applied also to a pack battery that has similarly a nonaqueous electrolyte secondary battery as a unit cell as long as a structure as the unit cell is the same. Here, as the other nonaqueous electrolyte secondary battery, for example, a sodium ion secondary battery or a lithium ion polymer secondary battery can be used.

In the above, specific embodiments of the present invention were described in detail. These are only illustrations and do not limit claims. The technologies described in claims include various modifications and alterations of the illustrated specific embodiments.

The invention claimed is:

1. A nonaqueous electrolyte secondary battery comprising:
   a wound electrode body wound along one plane including a winding axis;
   a battery case housing the wound electrode body such that the winding axis and a sidewall of the battery case intersect, a spatial volume excluding the wound electrode body in the battery case including a first spatial volume on a negative electrode side of the battery case and a second spatial volume on a positive electrode side of the battery case, the first spatial volume being larger than the second spatial volume in a direction of the winding axis of the wound electrode body, a first value being obtained by dividing the first spatial volume by the second spatial volume, and the first value being equal to or larger than 2.1 and equal to or smaller than 5.7; and
   a positioning member to position the wound electrode body within the battery case.

2. The nonaqueous electrolyte secondary battery according to claim 1, wherein the first spatial volume is a spatial volume between an end on an uncoated section side of a negative electrode sheet and a sidewall of the battery case, and
   the second spatial volume is a spatial volume between an end on an uncoated section side of a positive electrode sheet and the sidewall of the battery case.

3. The nonaqueous electrolyte secondary battery according to claim 1, wherein the battery case is rectangular parallelepiped,
   the wound electrode body includes a belt positive electrode sheet and a belt negative electrode sheet,
   the belt positive electrode sheet and the belt negative electrode sheet are superposed with a belt separator interposed between the belt positive electrode sheet and the belt negative electrode sheet, and the wound electrode body being wound,
   the positive electrode sheet includes a belt positive electrode current collector, a first uncoated section disposed on the positive electrode current collector along an edge in a direction of a winding axis of the positive electrode current collector, and a positive electrode active material layer containing a positive electrode active material and held on both sides of the positive electrode current collector excluding the first uncoated section,
   the negative electrode sheet includes a belt negative electrode current collector having thermal conductivity higher than that of the positive electrode current collector, a second uncoated section disposed on the negative electrode current collector along an edge in a direction of a winding axis of the negative electrode current collector, and a negative electrode active material layer containing a negative electrode active material and held on both sides of the negative electrode current collector excluding the second uncoated section,
   a length of the negative electrode active material layer is longer than a length of the positive electrode active material layer in a direction of the winding axis, and
   the positive electrode sheet and the negative electrode sheet are superposed such that the positive electrode active material layer is covered with the negative electrode active material layer and the first uncoated section and the second uncoated section are positioned on opposite sides each other in a width direction of the winding axis.

4. The nonaqueous electrolyte secondary battery according to claim 3, wherein the positive electrode current collector is made of aluminum, and
   the negative electrode current collector is made of copper.

5. A pack battery comprising:
   a plurality of the nonaqueous electrolyte secondary batteries, the plurality of the nonaqueous electrolyte secondary batteries according to claim 1 being assembled, the nonaqueous electrolyte secondary batteries being faced with surfaces having a larger width of the battery case and superposed the surfaces and adjacent wound electrode bodies are offset with each other in the direction of the winding axis.

6. The pack battery according to claim 5, wherein
   the nonaqueous electrolyte secondary batteries are adjacently assembled,
   the nonaqueous electrolyte secondary batteries have an offset rate equal to or larger than 1.3 and equal to or smaller than 6.0,
   the offset rate is defined with a width in the direction of the winding axis of the wound electrode body and an amount of offset in the direction of the winding axis of the adjacent wound electrode bodies, and
   the offset rate being obtained by multiplying a second value, which is obtained by dividing the amount of offset by the width, by 100.

* * * * *